US011455304B2

(12) United States Patent
Peng

(10) Patent No.: US 11,455,304 B2
(45) Date of Patent: Sep. 27, 2022

(54) GRAPH-BASED PREDICTIVE CACHE

(71) Applicant: SAP SE, Walldorf (DE)

(72) Inventor: Yang Peng, Pleasanton, CA (US)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 16/577,828

(22) Filed: Sep. 20, 2019

(65) Prior Publication Data

US 2021/0089452 A1 Mar. 25, 2021

(51) Int. Cl.
*G06F 16/2453* (2019.01)
*G06F 12/0891* (2016.01)
*G06F 16/955* (2019.01)
*G06F 16/901* (2019.01)
*G06F 16/2455* (2019.01)

(52) U.S. Cl.
CPC .... *G06F 16/24539* (2019.01); *G06F 12/0891* (2013.01); *G06F 16/24552* (2019.01); *G06F 16/9024* (2019.01); *G06F 16/955* (2019.01)

(58) Field of Classification Search
CPC ............... G06F 12/0813; G06F 16/955; G06F 16/24539; G06F 16/24552; G06F 16/9024; G06F 12/0811; G06F 12/0815; G06F 12/084; G06F 12/0891
See application file for complete search history.

(56) References Cited

U.S. PATENT DOCUMENTS

| 6,026,413 | A | * | 2/2000 | Challenger | G06F 16/9574 717/108 |
| 8,631,068 | B1 | * | 1/2014 | Jannink | G06F 16/1834 709/204 |
| 9,483,241 | B2 | | 11/2016 | Peng | |
| 9,542,570 | B2 | | 1/2017 | Peng | |
| 9,672,139 | B2 | | 6/2017 | Peng | |
| 9,733,930 | B2 | | 8/2017 | Yu et al. | |
| 9,904,574 | B2 | | 2/2018 | Peng | |
| 9,990,353 | B2 | | 6/2018 | Peng | |
| 10,171,240 | B2 | | 1/2019 | Peng | |

(Continued)

OTHER PUBLICATIONS

"SAP Business Connector Developer Guide" accessed Aug. 15, 2019, from https://help.sap.com/doc/6ee6c80b855140c0912b86d3511385ad/4.8/en-US/DOC_SBC_Developer_Guide_48E.PDF (691 pages).

(Continued)

*Primary Examiner* — William B Partridge
*Assistant Examiner* — Erich Alexander Fischer
(74) *Attorney, Agent, or Firm* — Klarquist Sparkman, LLP

(57) ABSTRACT

A predictive cache system learns data access patterns to build a graph of related data items. A main cache hosted by a cache server is accessed by a cache client having a local cache. A request to the cache server for one of the related data items generates a response including some or all of the related data items, which are stored in the local cache and can be served locally for subsequent requests. Predictive cache behavior coexists with legacy non-predictive cache operation. Load on the cache server and aggregate latency are considerably reduced. Graphs can be specific to a particular context. Locally cached content can be distributed and reused by other cache clients. The predictive cache system is suitable for large-scale web applications. Variations are described.

20 Claims, 12 Drawing Sheets

(56) References Cited

U.S. PATENT DOCUMENTS

| | | |
|---|---|---|
| 10,248,547 B2 | 4/2019 | Peng et al. |
| 2006/0015859 A1 | 1/2006 | Sattler et al. |
| 2006/0230234 A1 | 10/2006 | Bentolila et al. |
| 2008/0025298 A1* | 1/2008 | Lev-Ran .............. H04L 69/04 370/389 |
| 2008/0163063 A1 | 7/2008 | Bonev et al. |
| 2010/0287144 A1 | 11/2010 | Cha et al. |
| 2012/0030275 A1 | 2/2012 | Boiler |
| 2013/0227112 A1 | 8/2013 | Lehmann et al. |
| 2014/0006723 A1 | 1/2014 | Tammam et al. |
| 2014/0081930 A1 | 3/2014 | Cha et al. |
| 2014/0317047 A1 | 10/2014 | Wang |
| 2014/0317048 A1 | 10/2014 | Wang |
| 2014/0366002 A1 | 12/2014 | Jentsch et al. |
| 2015/0370545 A1 | 12/2015 | Schreter |
| 2016/0321376 A1* | 11/2016 | Taylor .............. G06F 16/9024 |
| 2016/0342658 A1 | 11/2016 | Skrzypczak et al. |
| 2016/0352858 A1 | 12/2016 | Moser |
| 2016/0378826 A1 | 12/2016 | Bensberg et al. |
| 2017/0147393 A1 | 5/2017 | Stammerjohann et al. |
| 2017/0147628 A1 | 5/2017 | Park et al. |
| 2017/0147638 A1 | 5/2017 | Park et al. |
| 2017/0228238 A1 | 8/2017 | Li et al. |
| 2017/0249310 A1 | 8/2017 | Kumar |
| 2018/0046562 A1 | 2/2018 | Peng et al. |
| 2018/0152438 A1 | 5/2018 | Liu et al. |
| 2018/0300189 A1 | 10/2018 | Peng et al. |
| 2018/0338015 A1 | 11/2018 | Wang et al. |
| 2019/0065560 A1 | 2/2019 | Rojkov et al. |
| 2021/0042438 A1* | 2/2021 | Scheideler ............ G06F 21/602 |

OTHER PUBLICATIONS

"Performance and Tuning Guide" accessed Aug. 15, 2019, from https://help.sap.com/doc/download_multimedia_zip-iq1610_sap_iq_performance_and_tuning_guide_pdf/16.0.10/en-US/SAP_IQ_Performance_and_Tuning_Guide.pdf (98 pages).

"The SAP ASE Data Cache" accessed Aug. 15, 2019 from https://help.sap.com/viewer/91e69223fcae44c99478ba9cd5bcblfc/16.0.1.0/en-US/a86fe4c8bc2b10148488831feld7I90c.html (2 pages).

* cited by examiner

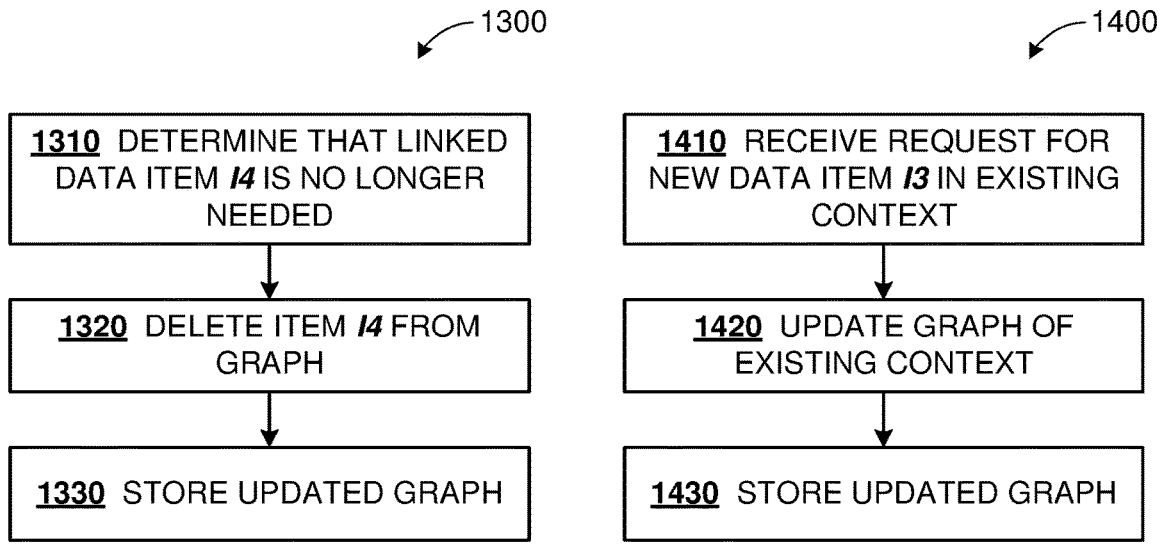
FIG. 13
FIG. 14
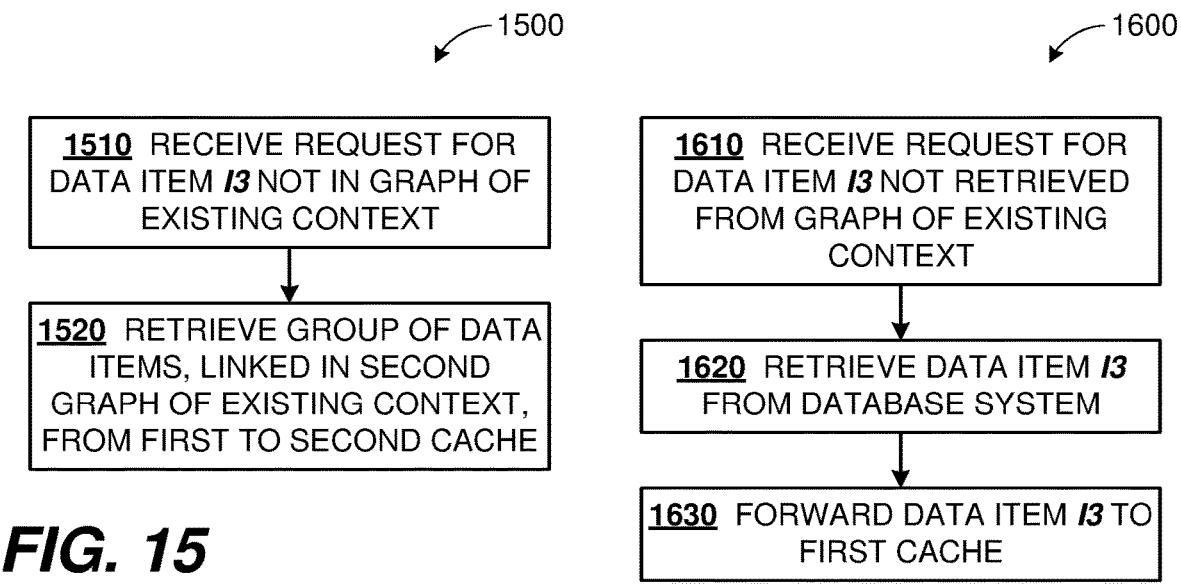
FIG. 15
FIG. 16

GRAPH-BASED PREDICTIVE CACHE

BACKGROUND

Caches can be used to improve latencies for fulfillment of data requests. However, even with caches, the total time required to access large numbers of data items can render application performance sluggish, and the data accesses can consume a large amount of computing resources. Accordingly, there is a need for improved technologies for data access.

SUMMARY

In summary, the detailed description is directed to various innovative technologies for a predictive cache. Examples of the disclosed technology can learn data access patterns to build a graph of related cacheable data items. A main cache hosted by a cache server can be accessed by a cache client having a local cache. A request to the cache server for one of the related data items can generate a response including some or all of the related data items, which can be stored in the local cache and served locally for subsequent requests.

In certain examples, the disclosed technologies can be implemented as computer-readable media storing instructions causing one or more hardware processors to perform certain operations. For example, according to the operations, a first request for a first data item, having a first context, is received from an application instance. Based on a graph associated with the first context, a plurality of data items are retrieved from a first cache and stored in a second cache. The plurality of data items includes the first data item and a second data item. Subsequently, a second request for the second data item is received from the application instance. The second request is fulfilled by retrieving the second data item from the second cache.

In some examples, the first cache can be managed by a cache server and the receiving, retrieving, subsequently receiving, storing, and fulfilling operations can be performed by a client of the cache server. The client and the application instance can be co-located on an application server distinct from the cache server. The graph can be built at the client of the cache server and can be transmitted to the cache server for storage in a graph repository at the cache server. The plurality of data items can be forwarded from a first client to a second client of the cache server prior to the second client receiving any request for one or more of the plurality of data items in the first context.

In additional examples, the graph can be maintained. Respective data items of the plurality of data items can be added to the graph as the respective data items are requested, prior to the first request, by one or more application instances having the first context. Particular data items can be deleted from the graph as the particular data items are determined no longer to be associated with the first context. The first context can characterize a transaction, and the plurality of data items can be flushed from the second cache upon completion of the transaction.

In further examples, a third request can be received from the application instance for a new data item not linked in the graph. For the third request, further data items linked in a second graph associated with the first context can be retrieved from the first cache and can be stored in the second cache. The further data items can include the new data item. The new data item of the third request can be absent from the plurality of data items, and can be retrieved from a database system. The new data item can be stored in the first cache.

In some examples, another request specifying the first context can be issued to the cache server hosting the first cache. An encrypted payload can be received from the cache server, which can be decrypted to extract the plurality of data items. Additionally or alternatively, a compressed payload can be received from the cache server, which can be decompressed to extract the plurality of data items.

In certain examples, the disclosed technologies can be implemented as computer-readable media storing instructions causing one or more hardware processors to perform certain operations. For example, according to the operations, a request for a given data item is received, wherein the request includes information describing a context of a requesting application instance. The context is mapped to a graph stored in a graph repository. A plurality of data items specified by the graph is collected from a data cache. The plurality of data items includes the given data item. The request is responded to by providing the collected plurality of data items.

In some examples, the information describing the context can include a client identifier, a session identifier, and an operation identifier. Collecting the plurality of data items can include following links indicating dependencies between pairs of the data items until traversal of the graph is complete. The links can be stored with respective ones of the data items in the data cache. A further request can be received to store the graph in the graph repository.

In additional examples, a second request for a second data item can be received, wherein the second request includes information describing the context. The second data item can be determined to be absent from the plurality of data items collected for the original request. The second data item can be determined to be present in the data cache. The second data item can be added to the graph.

In certain examples, the disclosed technologies can be implemented as a system of servers including a cache server and one or more application servers. Each server includes one or more processors with memory coupled thereto, and a network connection. The cache server is coupled to the one or more application servers via the respective network connections. The cache server is configured to execute instructions of an application cache service hosting a shared application data cache and a graph store. Each of the application servers is configured to execute instructions of an application cache client hosting a local cache and one or more instances of an application. The application cache client is configured to forward a first request for a first data item, received from a first instance of the application, to the application cache service together with an application context of the first instance of the application. The application cache service is configured to map the application context of the first instance of the application to a corresponding graph in the graph store; collect a plurality of data items, specified by the corresponding graph and including the first data item, from the shared application data cache; and return the collected data items to the forwarding application cache client to be stored in the local cache. In some examples, the application instances support web transactions over the network connections.

The foregoing and other objects, features, and advantages of the invention will become more apparent from the following detailed description, which proceeds with reference to the accompanying figures.

BRIEF DESCRIPTION OF THE DRAWINGS

FIG. 13 is a flowchart of an example method for updating a graph according to the disclosed technologies.

FIG. 14 is a flowchart of a first example method for handling a request for a new data item, according to the disclosed technologies.

FIG. 15 is a flowchart of a second example method for handling a request for a new data item, according to the disclosed technologies.

FIG. 16 is a flowchart of a third example method for handling a request for a new data item, according to the disclosed technologies.

DETAILED DESCRIPTION

Overview

Figure 1:
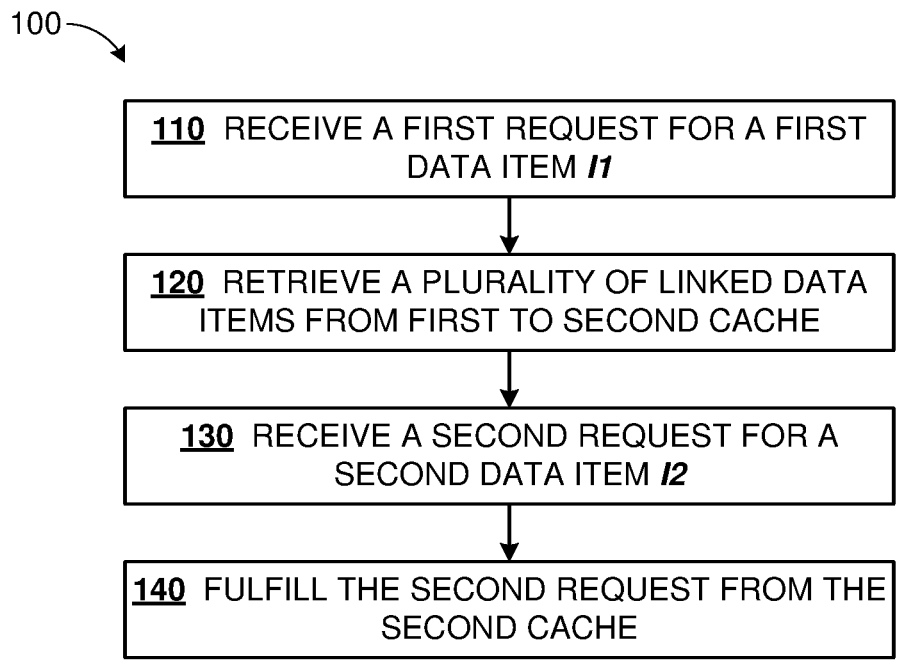
FIG. 1 is a flowchart of an example method for accessing cached data according to the disclosed technologies.

The data required by software applications can be resident in a database or storage environment that is slow or remote, leading to high latency. At high transaction volumes, congestion can lead to further increases in latencies. The use of caches to improve latency is widespread, and can have particular importance for service- and microservice-oriented distributed scalable application deployments, as are increasingly used today. However, as application deployments scale, caches can be pushed to their hardware limits in storage capacity, processing capacity, and network capacity.

Another factor that has contributed to loading of a caching system is an application architecture paradigm in which applications can be assembled with numerous standalone functions or services, and required data can be organized in numerous blocks, e.g. by function or by object. A single client action can routinely invoke two, three, four, and sometimes more than ten distinct services, each of which can draw upon similar numbers of cacheable blocks of data. Overall, there can be a total of hundreds or even thousands of individual requests for data items, even for a straightforward task such as displaying a web page. There can be significant overlap among data items required by the distinct services. Because of the siloing inherent in the architecture, however, it is not easy to reorganize the data access requests to improve efficiency of cache access, and a common result is to have a large number of separate data requests to a caching system, which can cause congestion at the caching system, and can cause stacking of the individual latencies at the application. Some of the data requests can be independent, while other data requests can be dependent on return values of previous data requests. To put the situation in perspective, a single cache access can take 1-5 ms in many operating environments, and a maximum end-to-end response time of 1 s can be desirable. With a few thousand individual cache accesses, the total cache access latency can easily exceed 1 s, and can be in a range of 10 s-1 minute, which can be completely unacceptable.

Examples of the disclosed technologies take advantage of repetitive patterns in data access to improve both cache loading and overall latency. Data requests from an application instance or a client session can be monitored. The requests can be associated with respective contexts, which can variously depend on the tasks being performed, client identity, or objects with which the tasks are being performed. Over one or more transactions or sessions, patterns can be learned for each context. Patterns can indicate links between data items observed to be requested together—e.g. a request for data item I1 is likely to be followed by a request for data item I2—or indicate associations between a group of data items and a given context—e.g. context C1 is likely to lead to a request for data items I3, I4, I5. The patterns can be represented in a graph, which can be, for example, a dependency tree or a directed acyclic graph (DAG). With sufficient monitoring, confidence in the accuracy of a graph can be established, and the graph can be published to a graph repository to be invoked when the same context is encountered subsequently.

A main cache can be hosted at a cache server. Requests to the cache server can include identification of the requested data item as well as identification of the requesting context. Then, if a graph for this context is present in the graph repository, the graph can be traversed and some or all linked data items can be collected and returned to the requester. So, a request for a single data item can result in a response of hundreds or thousands of data items linked in the graph of the present context. On the application side, a client of the cache server can act as a proxy for the cache. The linked data items can be stored in a local cache by the cache client and only the specific requested item can be passed immediately to the application, as expected. Subsequent application requests for data items can use data items that are found in the cache client's local cache and returned directly to the application, without further recourse to the main cache. The behavior of such a predictive caching system can be transparent to the application, and the load on the main cache can be greatly reduced. The overhead for collecting linked data items at the cache server can often be insignificant: at around 1 μs for each data item, the total time to collect even thousands of data items can be just a few ms. And in situations where no graph has been stored for the requesting context, the cache server can return the requested data item in a conventional way, with no penalty.

Thus, the disclosed technologies can provide significantly improved caching performance and are well-suited to large-scale, distributed, or service-oriented applications. Some examples below are described in terms of an e-commerce environment for the sake of familiarity and ease of illustration, however the disclosed technologies are not limited thereto. Rather, the disclosed technologies can be widely applied to many large-scale client-facing or infrastructure applications, such as for airline booking systems, banking, email, telephony, or other electronic communications, online gaming, government services, search, or social media.

Terminology

The usage and meaning of all quoted terms in this section applies throughout this disclosure unless clearly indicated otherwise or repugnant to the surrounding language. The terminology below extends to related word forms.

The term "access" refers to an act of calling, invoking, reading from, or writing to a computing resource. As an example, in this disclosure, a cache can be accessed for reading, writing, or updating cached data items.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). Many modern applications can support multiple clients concurrently, and each client can be isolated from other clients, so that each client perceives having its own copy of the application. These actual or perceived copies of the application are dubbed "application instances." Two application instances can have distinct copies or versions of at least some program code and/or some program data, but can otherwise share at least some program code and/or some program data. The term application instance extends to an application having a single instance.

The unqualified term "data" refers to any digital representation of information. Of particular interest are "data items," which are data entities whose values convey particular meaning to an application instance. In this disclosure data items can be requested by an application instance and can be provided from a cache or from a database. Data items can also be provided by the application instance for storage in a cache or in a database.

A "cache" is a data store maintaining copies of one or more data items whose master or original copy is stored elsewhere. Some caches can be hosted on or coupled to a "cache server," and can be accessed for read or write operations through a "cache service." Such caches can be accessed by a "cache client" or directly by an application. Other caches can be integrated into an application or into a cache client. A cache client can be integrated into an application. A cache can be regarded as logically situated between a master repository such as a database, which can be regarded as a producer of data items, and an application, which can be regarded as a consumer of data items. Caches can be tiered at increasing logical distances from an application. An application's request for a data item can be directed to a first tier cache logically nearest the application. If the first tier cache does not contain the requested data item (dubbed a "cache miss"), then the request can be directed to the next tier, and so on, until the requested data item is found in a cache (dubbed a "cache hit") or not found in any cache. In the latter case, the data item can be retrieved from a database or other master repository. Items stored in a cache can be updated, or can lose validity due to an update of a master or original copy, or can lose validity due to expiration of a time-to-live (TTL) lifetime.

A "client" is a hardware or software computing entity that uses a resource provided by another hardware or software computing entity dubbed a "server."

The term "compress" refers to a process for reducing the physical size (e.g. in bits or bytes) of some data, which can be a single data item, a data structure, or a collection of such data items or data structures. "Decompression" can be the converse of "compression." While compression and decompression can use distinct complementary algorithms, the term "compression algorithm" can refer to such a complementary pair of an algorithm performing compression and an algorithm performing decompression. Compression can reduce utilization of a network or other communication resource for data transmission. Compression can be lossy or lossless. While some data items described herein can be compressed losslessly in order to recover an original data item exactly, other data items such as images can be transmitted with lossy compression for more economical utilization of resources. Particularly, some applications can use a lossy low-resolution image available with low latency, followed by a lossless high-resolution image.

A "context" is a set of parameters associated with or defining one or more transactions, one or more sessions, one or more application instances, or one or more requests. That is, in some circumstances or embodiments, a transaction context or a session context can be used, while other circumstances or embodiments, a request context or an application instance context can be used. A context can change or remain the same between successive requests of an application instance executing a transaction. Particularly, a context can evolve dynamically during a transaction or session. A context need not be unique, i.e. multiple sessions, transactions, application instances, or requests can share a single context, which facilitates reuse of associated graphs described herein.

A "database" or "database system" is an organized collection of data maintained on computer-readable media and accessible by execution of instructions at one or more processors. Databases can be relational, in-memory or on disk, hierarchical or non-hierarchical, or any other type of database. A database can store an original or master copy of one or more data items.

A "dependency" is a causative or correlative association between two data items, which can be dubbed a leading data item and a following data item, respectively. That is, a request of the leading data item can indicate a likelihood that the following data item will also be requested. A following data item in one dependency relationship can be a leading data item in one or more other dependency relationships.

The term "encrypt" refers to a reversible process of transforming data so that the original data is hidden or cannot be discovered from the transformed data without knowledge of a key, code, or decryption algorithm. "Decryption" can be the converse of "encryption." While encryption and decryption can use distinct complementary algorithms, the term "encryption algorithm" can refer to such a complementary pair of an algorithm performing encryption and an algorithm performing decryption. Encryption can provide security for distribution of sensitive, private, or confidential data.

The term "flush" refers to an operation on a cache or other data store in which one or more items stored in the cache is erased, removed, or marked invalid.

A "graph" is a set of two or more vertices and a set of one or more edges joining respective pairs of the vertices. The edges can be directed (e.g. where one vertex is dependent on or follows from another vertex, often represented with single-ended arrows) or undirected (e.g. having a symmetric relationship between vertices, often represented with arrow-free lines or bidirectional arrows). In this disclosure, the terms "graph" and "dependency tree" are often used interchangeably, however a dependency tree has directed edges, while a graph can have directed or undirected edges. Moreover, a graph need not be a tree. A graph in which a path exists between every pair of vertices is a "connected graph." The graphs described herein are often connected graphs. A graph is a logical structure and can be implemented using any of various types of data structures to track vertices and edges (e.g. linked lists, arrays).

A "link" is a component of a data structure that designates another data item or data structure. A link can be used to define a directed edge of a graph or a dependency between two data items, and can support traversal of the graph. A pair of reciprocal links can define an undirected edge of a graph and can support traversing the graph freely, irrespective of directional relationships between connected vertices. The term link is also used occasionally in a second meaning, as part of a communication network, e.g. a communication link.

A "list" is an ordered or unordered finite collection of objects or values. A list does not require any particular organization as a data structure, although vectors, arrays, or linked lists can be commonly used.

The term "maintain" refers to operations that can modify a data item, a data structure, a database, or other collection of data through one or more updates. In this disclosure, caches, stores, graphs, data items, or databases can variously be maintained.

The term "map" refers to an operation that transforms an input value or variable into an output value or variable according to a predefined association or function. In this disclosure, each context can be associated with one or more specific graphs. Identifying or retrieving the graph (output) given a particular context (input) can be a mapping operation.

An "operation" is a group of one or more related computer-implemented actions. An operation can perform a step of a larger task or transaction within an application. An operation can target or act on an object (dubbed "operand"), which can be a data object, a device, or program code.

A "payload" is a collection of data transmitted from one hardware or software entity to another. For example, a cache server can return a payload of related data items to a requesting cache client.

A "request" is a message to which a substantive response is expected, that is, a response beyond an acknowledgment. In contrast, a "notification" need not receive a substantive response.

"Root" refers to the topmost level of a tree or multi-level data structure.

A "server" is a computer, implemented as hardware on which software is executed, providing one or more services or access to one or more resources for at least one client, and often for a plurality of clients. In this disclosure, servers can host applications, cache functions or services, caches, stores, or databases, or can provide other functions.

A "session" is set of interactions between two or more computing entities, such as between a client and a server, over a time interval, which can be contiguous or interrupted. A session can include one or more transactions or fractions thereof, as well as interactions which may not be transactions. To illustrate, in a single session, a client can complete two purchase transactions, update account information (also a transaction), and perform research on available products (not a transaction).

The term "shared" refers to a computing resource that can be accessed by more than one client or user of the resource. For example, a cache client can be shared among multiple application instances on an application server. A cache server can be shared among multiple cache clients on respective application servers.

The term "smart" refers to a cache server, a cache client, or a caching system implementing or supporting a predictive cache technology as disclosed herein. Such caching components may be smart even if not explicitly qualified as such.

"Software" refers to computer-executable programs or instructions and associated data structures.

A "store" or "repository" is a data storage entity. The term store can be qualified by a type of data stored therein, for example, a graph store can store one or more graphs.

A "transaction" is a set of interactions between two or more computing entities, such as between a client and an application, for the performance of a specified task. A transaction can be performed during a single session, or can be distributed across multiple sessions. As an example, a transaction can be started by a first client or a first application instance during a first session, and can be completed by a second client or a second application instance during a second session. A single transaction can include multiple operations. For example, a single e-commerce purchase transaction can include multiple operations of adding or removing items from a shopping basket, viewing the shopping basket, providing shipping or payment information, and/or submitting the purchase information.

"Traversal" refers to the operations of traveling from vertex to vertex along edges of a graph. Optionally, additional functions can be performed at all or some of the traversed vertices. For example, during traversal of a graph of data items, those data items having valid entries in a cache can be collected. In examples, a traversal can reach all vertices of a graph, or all vertices that are reachable from a given starting vertex.

A "tree" is a data structure in the form of a graph, in which records of the data structure are vertices of the graph, one of the vertices is a root vertex, and every other vertex of the tree has a unique parent vertex that can ultimately be traced back to the root vertex. A vertex which is not parent of another vertex (i.e. it has no child vertices) can be dubbed a leaf or leaf vertex. Dependency trees described herein can have data items as vertices. The children of a given data item are those data items that are likely to be requested following a request for the given data item. Some operations on trees described herein can be understood to be similarly applicable to other graphs such as DAGs.

The term "web" refers to the Internet or to another network using similar protocols. A client that accesses a resource (such as an application, service, or server) over the web can be a "web client" of that resource.

Example Methods—Accessing Cached Data

FIG. 1 is a flowchart 100 of an example method for accessing cached data. A request for an initial data item causes associated data to also be retrieved. The associated data items can be used to fulfill subsequent requests. The example method can be performed at a cache client as described herein.

At process block 110, a request for a first data item can be received from an application instance. The application instance can issue the request while performing a task. Thus, the request or the application instance can be associated with a context in which the task is being performed. By way of illustration, the task can be a web transaction, and the context can specify parameters of the transaction such as a web client identifier, a transaction identifier, or an action being performed as part of the transaction.

At process block 120, multiple data items can be retrieved from a first cache and stored in a second cache. The retrieved data items can be linked with the requested first data item in a graph associated with the context of the request. The first cache can store data items with a lifetime extending beyond the task associated with the instant request, while the second cache can have a scope limited to the duration of the task. The first cache can be shared between multiple application instances on multiple servers, while the second cache can be local to the requesting application instance or to its associated cache client.

At process block 130, a second request is received for a second data item. The second data item can be linked to the first data item in the graph used at process block 120, and hence can be present in the second cache. Thus, at process block 140, the second request can be fulfilled by retrieving the second data item from the second cache, rather than from the first cache. In this manner, a single retrieval from a remote first cache can be used to fulfill many sequential requests from an application instance—two, three, dozens, hundreds, or even thousands of requests. The latency of many successive data requests can be collapsed into the latency of a single request.

Numerous variations are possible. In some examples, the context of the first request can characterize a transaction being executed by the requesting application instance, and the associated data items can be flushed from the second cache upon completion of the transaction. As described herein, the method of flowchart 100 can be performed by a cache client, that is, a client of a cache server managing the first cache. The cache client and the application instance can be co-located on an application server or in a data center, distinct or remote from the cache server. The method can extend to construction, maintenance, or deletion of graphs associated with respective contexts.

Example Operations

Figures 2, 3:
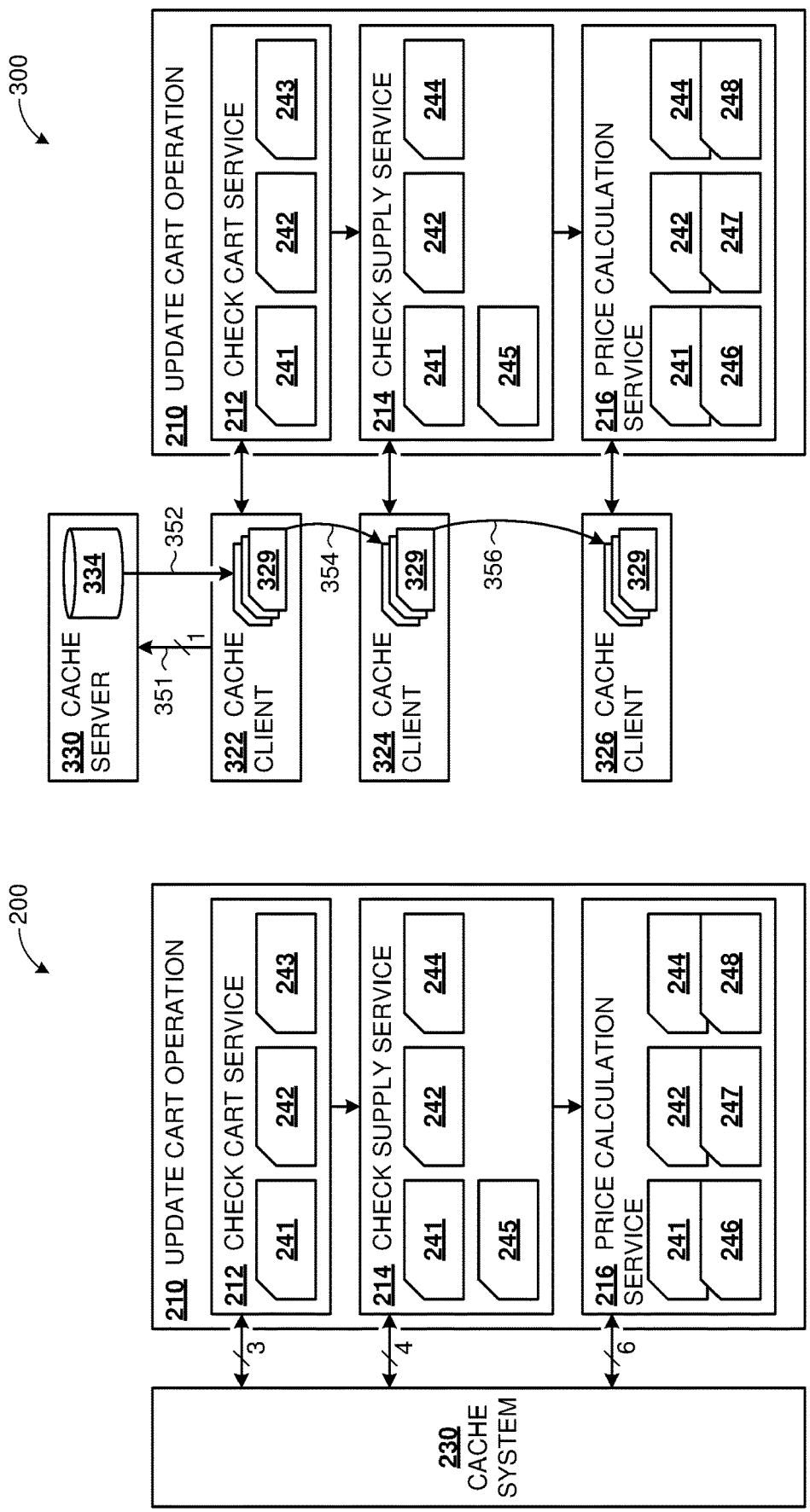
FIG. 2 is an illustration of an example operation according to conventional technology.
FIG. 3 is an illustration of the example operation of FIG. 2, with disclosed technologies applied.

FIG. 2 is an illustration 200 of an example operation according to conventional technology. This example pertains to an e-commerce purchase transaction, in particular a client-initiated operation 210 that updates a shopping cart, and illustrates benefits of the disclosed technology.

The update operation 210 can be implemented as a series of three service calls: to a check cart service 212, to a check supply service 214, and to a check cart service 216. Each call requires data items from one or more distinct pools of cached data.

Check cart service 212 can require access to data 241 about a client user, which can be obtained from a user cache; data 242 about a seller, which can be obtained from a seller cache; and data 243 about a product being added to the cart, which can be obtained from a product cache. Check supply service 214 can require access to user data 241 and seller data 242, which can be repeated from check cart service 212. Check supply service 214 can also require data 244 pertaining to a sale campaign and data 245 pertaining to a supply chain. Data 244, 245 can be obtained from a supply chain cache and a sale campaign cache respectively. Price calculation service 216 can require user data 241, seller data 242, and sale campaign data 244, as well as data 246 pertaining to addresses from an address cache, data 247 pertaining to logistics from a logistics cache, and data 248 pertaining to payments from a payment cache. Because the services 212, 214, 216 can be developed as independent services and can access independent silos of e.g. user data, seller data, etc., a minimum of 3 cache accesses can be required for check cart service 212 (that is, at least one access for each pool of cached data), 4 cache accesses for check supply service 214, and at least 6 cache accesses for the price calculation service 216. That is, execution of the update cart operation 210 can require 13 separate cache accesses. Because the services can execute sequentially, the latencies can add up. Where 100 ms can seem an acceptable latency for a single cache access, and even 300 ms can appear acceptable for a single service such as check cart service 212, an aggregate latency of 0.3+0.4+0.6 s=1.3 s can be unacceptable.

FIG. 3 is an illustration of the example operation of FIG. 2, implemented with presently disclosed technologies. The update cart operation 210, with its constituent services 212, 214, 216 can be similar to that discussed for FIG. 2. However, the cache technology can be different. Check cart service 212 can have its data requests served by cache client 322. The first time check cart service 212 needs a data item, a request can be made to its cache client 322, which can forward the request (arrow 351) to cache server 330 along with the requesting context of the instant update card operation 210. As described herein, the cache server 330 can identify multiple data items that have been linked together according to a graph of the requesting context. These data items can be retrieved from data cache 334 and collected in a package 329. The cache server 330 can return the package of data items 329 to the cache client 322. Data items 329 can include some or all the data items associated with the current context, and can include data items likely to be requested not only by check cart service 212, but also data items likely to be requested by check supply service 214 and price calculation service 216. Thus, the cache needs of check cart service 212 can be met by a single cache request at arrow 351, rather than 3 requests as described for FIG. 2.

In some examples, all three services 212, 214, 216 can be implemented on a single application server having a single cache client 322, and all three services can be readily served by the single copy of packaged data items 329 at cache client 322. However, in other examples, the services 212, 214, 216 can be distributed among two or even three distinct application servers. Services 214, 216 can have respective cache clients 324, 326 distinct from cache client 322, as shown in FIG. 3. In such cases, the package of data items 329 can be forwarded from cache client 322 to cache client 324 (arrow 354), and further to cache client 326 (arrow 356), prior to the associated services 214, 216 making requests for any of the packaged data items 329. Thus, even with a distributed service architecture, the disparate cached data requirements of the three services 212, 214, 216 can be served with a single data request 351 to the cache server 330.

Example Context Data Structure

Figure 4:
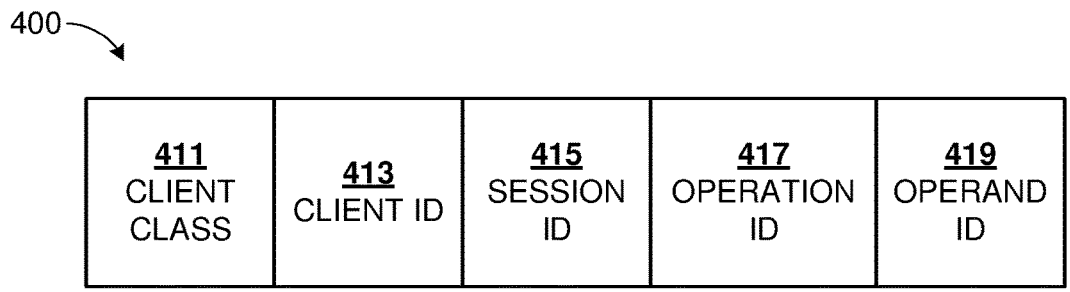
FIG. 4 is a diagram of an example data structure of a context according to the disclosed technologies.

FIG. 4 is a diagram of an example data structure 400 for a context according to the disclosed technologies. The data structure comprises various fields that define a context of an application instance, or the task being executed by the application instance. Field 413 can be a client identifier (identifier being dubbed "ID" herein), which can be a user ID (e.g. email address, account name, real name, alias, government issued identifier, application specific identifier, or other identifier), a device ID (e.g. MAC address, phone number, mobile subscriber identification number, universally unique identifier (UUID), serial number, or other identifier), or a similar identifier associated with a client of the application instance. Field 411 can be a client class, reflecting different levels of service afforded to different classes of clients. For example, developers, managers, customers, or premium customers of an application can have respective client classes. The related data items can be different for different client classes, even for similar transactions. For one client class, a request for data item I1 can likely be followed by requests for items I2, I3 (but not I4, I5), while for another client class, a request for data item can likely be followed by requests for data items I2, I4, I5 (but not I3).

Field 415 can be a session identifier. That is, a given client specified by fields 413 or 411 can undertake multiple sessions, either concurrently or spread out over time, and the context for each session can be different. To illustrate, a customer client of an e-commerce application can undertake different sessions to purchase different types of items; the contexts for these sessions can be distinct. The customer client can further undertake a session to search for a product of a particular type: such a search session can have different context from either purchase session. A session can be a transaction, which can have a consequent action (e.g. fulfillment of a purchase) or can cause an application database to be updated (e.g. update of a customer's profile) but this is not a requirement. Some sessions can be purely exploratory (e.g. searching for a product, or checking an account balance) and need not involve any transaction.

Within the session 415, fields such as 417, 419 can further specify operations being performed. Operation ID field 417 can identify a particular operation, such as adding a product item to a shopping basket, and operand ID field 419 can identify an entity involved in the operation 417.

Data structure 400 is illustrative, and numerous variations can be employed. In particular, more or less fields can be employed. Client class field 411 can be unnecessary in some examples, and can be omitted. Client field 413 can be unnecessary, e.g. if the context is sufficiently identified by the session ID 415, and can also be omitted. For some applications, such as in a classroom or conference setting, an application instance can have multiple clients. Thus, the client ID 415 can be replaced by a first field indicating a number of clients, and subordinate fields respectively identifying the various clients. Alternatively, the client ID 413 can be replaced by a group ID indicative of a group of clients associated with a particular application session. Some operations 417 (e.g. emptying the shopping basket, or an application reset) can lack any operand 419. In such cases the operand ID 419 can be omitted or set to a predefined null value. In some examples, the context can be maintained at the client level, and the client's context can be shared across sessions. In such examples, the session ID 415 or the operation ID 417 can be omitted.

In further examples, a given context can be associated with multiple graphs, such as one graph for the client 413, a second graph for the session 415, and a third graph for an operand 419 (e.g. a specific product being added to a shopping basket). In such cases it can be desirable to organize data structure 400 as a hierarchical structure, with sub-trees for parameters of respective graphs, each sub-tree containing those context fields identifying the respective graph.

First Example Graph

Figure 5:
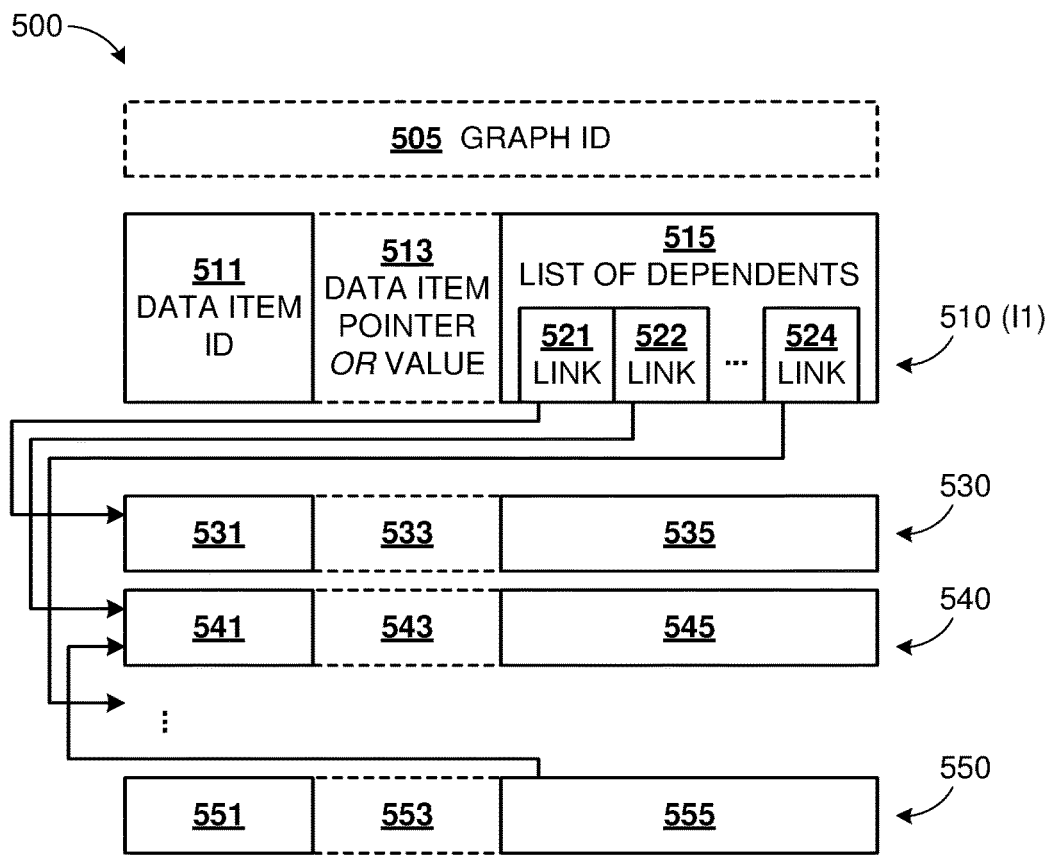
FIG. 5 is a diagram of linked data records according to an example of the disclosed technologies.

FIG. 5 is a diagram 500 of linked data records that can be used to represent a graph of data items as described herein. Several variants are described with reference to diagram 500.

Diagram 500 comprises four records 510, 530, 540, 550 for respective data items, with links from one record to another. The structure of each record 510, 530, 540, 550 can be similar. A given data item I1 can have a record 510 and an identifier 511 stored in a field of record 510. Also in the record 510 is a list 515 of dependent data items. The dependent items can be those items likely to be requested following a request for data item I1. The list 515 can include links to the various dependent data items; these links can be handles or pointers to the records 530 etc., or can be the corresponding identifiers 531 etc.

Data item IDs 511, 531, 541, 551 (or the records 510, 530, 540, 550) can be regarded as vertices of a graph, and the links 521, 522, 524, etc. can be regarded as edges of the graph. Thus, these fields are sufficient to define the graph.

However, the graph can be coupled to entries in a data cache storing values for the respective data items. In some examples, additional fields 513, 533, 543, 553 can be included within respective records 510, 530, 540, 550. These fields 513 etc. can store pointers to the respective data cache entries in which the value of the data items I1 etc. can be stored. In other examples, the graph can be embedded in the data cache, and fields 513 etc. can store the values of the respective data items I1 etc. In such examples, the graph repository can be synonymous with the data cache, and a separate graph repository can be omitted.

Numerous variations can be deployed. Optionally, a graph ID field 505 can be provided to distinguish a graph for one context from a graph for another context. In other examples, the graph ID 505 can be omitted, and the address of the graph in a graph repository can be used as an implicit identification of the graph. In some examples, the data item ID 511 can be the pointer to the corresponding data cache entry, and a separate field 513 for the pointer can be omitted. Further, the links shown in diagram 500 are directional, indicating a directional dependency between data items. The associated graph can be a directed acyclic graph (DAG), or even a tree. In such examples, a request for a data item I1 can be fulfilled with a subset of the graph, i.e. all data items of the graph that are dependent on data item I1 can be returned, while antecedents or parents of data item I1 can be omitted from the response payload.

Collecting data items, to be returned in response to a request, can include following the dependency links as indicated in diagram 500, from a starting vertex, until all dependency paths have reached either (a) a record having no dependents or (b) a record whose dependent data items have all been collected already. When a termination condition such as (a) or (b) has been met for all dependency paths, traversal of the graph (from the starting vertex) can be regarded as complete. In some examples, the starting vertex can be the vertex of a requested data item, while in other examples, traversal can start at a root vertex.

In other examples, links can be bidirectional, and the records 510 etc. can include a further field comprising a list of antecedent data items, allowing the graph to be traversed freely starting at any vertex (data item). In further examples, the graph can be organized as a tree, and a request for any data item within the tree can lead to data items being collected starting from the root of the tree.

In examples where the fields 513 etc. are omitted from the graph of diagram 500, a separate table can store e.g. key-value pairs matching each data item ID 511 with its respective pointer 513. Additionally, a further data structure can be implemented to map a context to a specific graph. For example, a hash table can be used.

Second Example Graph

Figure 6:
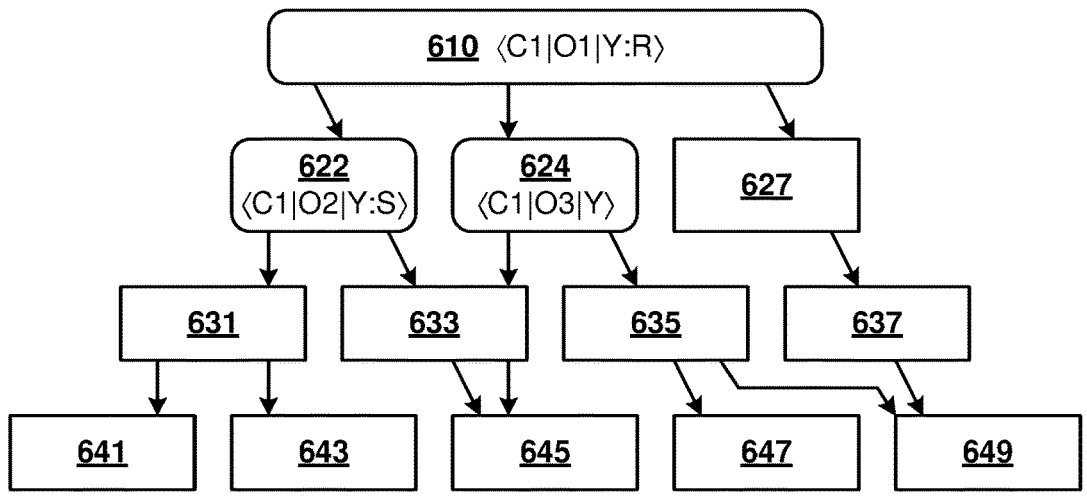
FIG. 6 is a diagram of an example graph according to the disclosed technologies.

FIG. 6 is a diagram 600 of another example graph, drawn as dependencies between various operations and various cached data items. In this example, an operation is characterized by a context including a client identifier C, an operation identifier O, and an operand or target T. Furthermore, the target T can be an attribute A of an entity E. Thus, an operation can be described with the notation ⟨C|O|T⟩ or ⟩C|O|E:A⟩. The dependencies illustrated as arrows in FIG. 6 can be ascertained by monitoring sequential data requests over one or more iterations of similar operations.

Diagram 600 can pertain to a particular context. Operation 610 can be the root operation of this context: a client C1 can perform an operation O1 targeting attribute R of an entity Y. Thus, operation 610 can be written as ⟨C1|O1|Y:R⟩. Operation 610 can be similar to the update cart operation 210 described herein for FIG. 2. Operation 610 can itself require a cached data item 627, and further operations 622, 624 can be determined to follow operation 610. In this example, operations 622, 624 can be actions O2, O3 performed for client C1 on field R of entity Y, and on the entire entity Y, respectively. Operations 622, 624 can be similar to calls of services 212, 214 described for FIG. 2.

In turn, operations 622, 624 can have dependent data accesses for data items 631, 633, 635 as indicated. Further dependent data items 637, 641, 643, 645, 647, 649 are also shown. As shown in FIG. 6, a data item (e.g. 627, 631) or an operation (e.g. 610, 622) can have one or more immediately dependent data items. A given data item (e.g. 631, 633, 641, 649) can be dependent on one or more than one parent data items or operations. A given data item (e.g. 645) can be multiply dependent on a parent data item (e.g. 633), through paths originating from operations 622, 624 respectively. The graph of diagram 600 is a DAG; other dependency graphs can be trees as described herein.

Example Methods—Serving Cached Data

Figure 7:
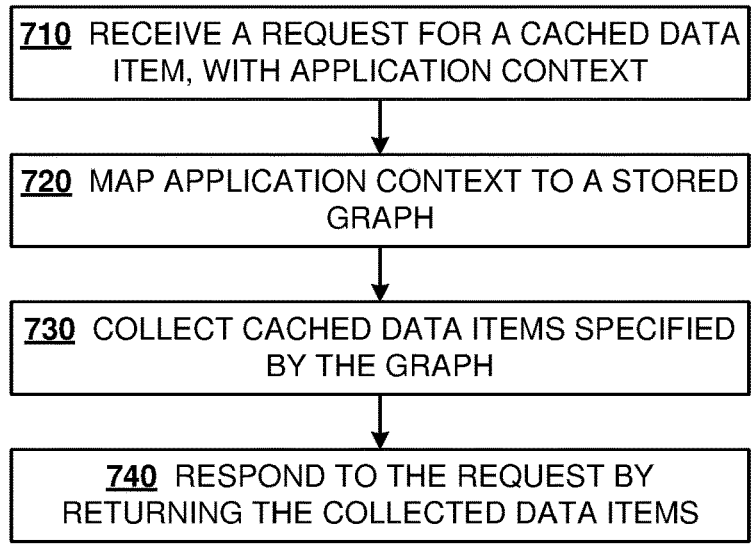
FIG. 7 is a flowchart of an example method for serving a request for cached data, according to the disclosed technologies.

FIG. 7 is a flowchart 700 of an example method for serving a request for cached data, according to the disclosed technologies. This method can be performed at a cache server and can complement the method of FIG. 1 described herein.

At process block 710, a request for a cached data item can be received. The request can include information describing a context of the request, which can be a context of an application instance from which the request originated, or a context of a transaction being performed by the application instance. At process block 720, the context can be mapped to a graph stored in a graph repository. At process block 730, the data items specified by the graph can be collected from a data cache; these collected data items can include the requested data item. Then, at process block 740, the collected data items can be transmitted in a response to the received request.

Numerous variations can be employed. The response can be encrypted, for security, or compressed, to reduce network loading or network transmission time. The request can be received from a cache client, which can be co-located with an application instance at which the request originated. The response can be sent to the requesting cache client. The response can be broadcast or multicast to multiple application servers on which application instances could be processing (or, could be likely to process) tasks with the same context. The response can include a copy of the graph. The method can include receiving a request to store the graph in the graph repository, which can be a request to store an updated version of an existing graph, or a new graph not already in the graph repository.

The graph update can also be performed at a cache server. A request specifying a data item can be received for a context whose graph does not include the requested data item. Upon determining that the requested data item is not included in the graph, and is present in a data cache, the requested data item can be added to the graph.

Example Methods—Interaction Between Cache Client and Cache Server

Various features can be implemented between a cache server and its cache client, such as encryption or compression. In response to receiving a request for a data item, the cache client can forward the request to its cache server. The forwarded request can specify an instant context for the received request. The data items linked to the requested data items can be returned as an encrypted or compressed payload, which can be decrypted or decompressed to extract the linked data items. Encryption or decryption can be performed using AES, DES, Triple DES, Blowfish, Twofish, or another open, publicly available, or proprietary encryption algorithm. Compression or decompression can be performed using Huffman coding, Lempel-Ziv compression, entropy encoding, or by other open, publicly available, or proprietary compression algorithm. Compression and encryption can be used together.

Example Sequence Diagram

Figure 8:
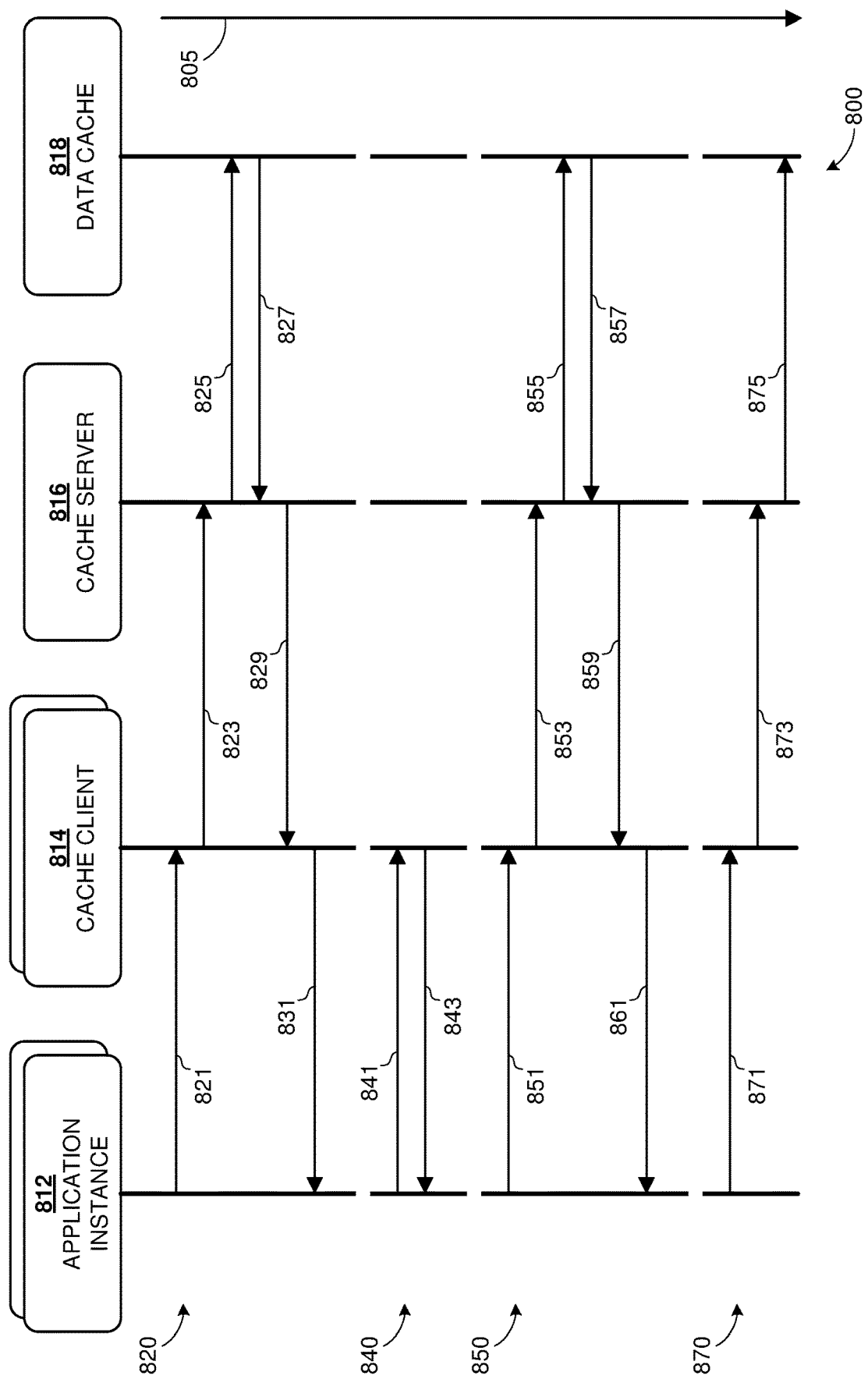
FIG. 8 is a sequence diagram illustrating example dialogues using the disclosed technologies.

FIG. 8 is a sequence diagram 800 illustrating some example action sequences, dubbed "dialogues". In these example dialogues, an application instance 812 can make service requests to or through a cache client 814, which can be a client of cache server 816. The cache server 816 can manage a data cache 818. Cache client 814 can also manage a local or short-term cache which is not distinguished from the client 814 in the diagram 800. All dialogues in diagram 800 pertain to a single context. Time is generally increasing downwards as shown by arrow 805, however the dialogues 820, 840, 850, 870 need not occur in exactly the order illustrated.

Arrows 821-831 represent a first dialogue 820 for requesting a data item. At arrow 821, application instance 812 can issue a request for a particular data item I1. At arrow 823, the request can be forwarded to the cache server 816, bundled with the requesting context. The cache server 816 can identify the graph for the requesting context, and at arrow 825 can issue a request for the various data items linked in the graph to the data cache 818. These various data items can be returned to the cache server 816 at arrow 827, which can forward the returned data items to cache client 814 at arrow 829. Finally, the originally requested data item can be made available to the requesting application instance at arrow 831. All the returned data items can be retained in a local cache at cache client 814.

In the second dialogue 840, the application instance 812 can, at arrow 841, request a second data item for the same context. In this illustration, the second data item can already be present in the local cache of cache client 814, having been delivered at arrow 829. Thus, the cache client 814 can directly fulfill the request 841, without recourse to the cache server 816 or any other external resource.

The third dialogue 850 pertains to a case in which a new data item can be requested. At arrow 851, the application instance 812 can request a third data item from cache client 814. In this dialogue, the third data item can be absent from the collection of data items delivered to cache client 814 at arrow 829. Accordingly, the cache client 814 can update its local dependency graph and any associated counters, and forward the request for the third data item to the cache server 816 at arrow 853. The cache server 816 can request (at arrow 855) and receive (at arrow 857) the third data item from the data cache 818, which can be passed back to cache client 814 (at arrow 859), stored locally at cache client 814, and returned to the requesting application instance 812 (at arrow 861).

Dialogue 870 illustrates termination of a task. Eventually, the task being performed at application instance 812 can end, and the termination of the task can be notified to cache client 814 at arrow 871. Some updates to the graph can be determined by the cache client 814, and an updated graph can be forwarded to the cache server 816 at arrow 873. The cache server 816 can store the updated graph in its graph repository (not shown). In instances where links between data items are maintained in the data cache 818, link updates can be applied at arrow 875. In examples, cache client 814 can flush its local cache in response to notification 871.

As illustrated in sequence diagram 800, the dialogues need not occur with just a single application instance 812 or cache client 814. Given that dialogue 820 can occur with a first application instance 812 and first cache client 814, subsequent dialogues such as 840 or 850 can occur with different application instances 812 working through the same or a different cache client 814.

First Example Architecture

Figure 9:
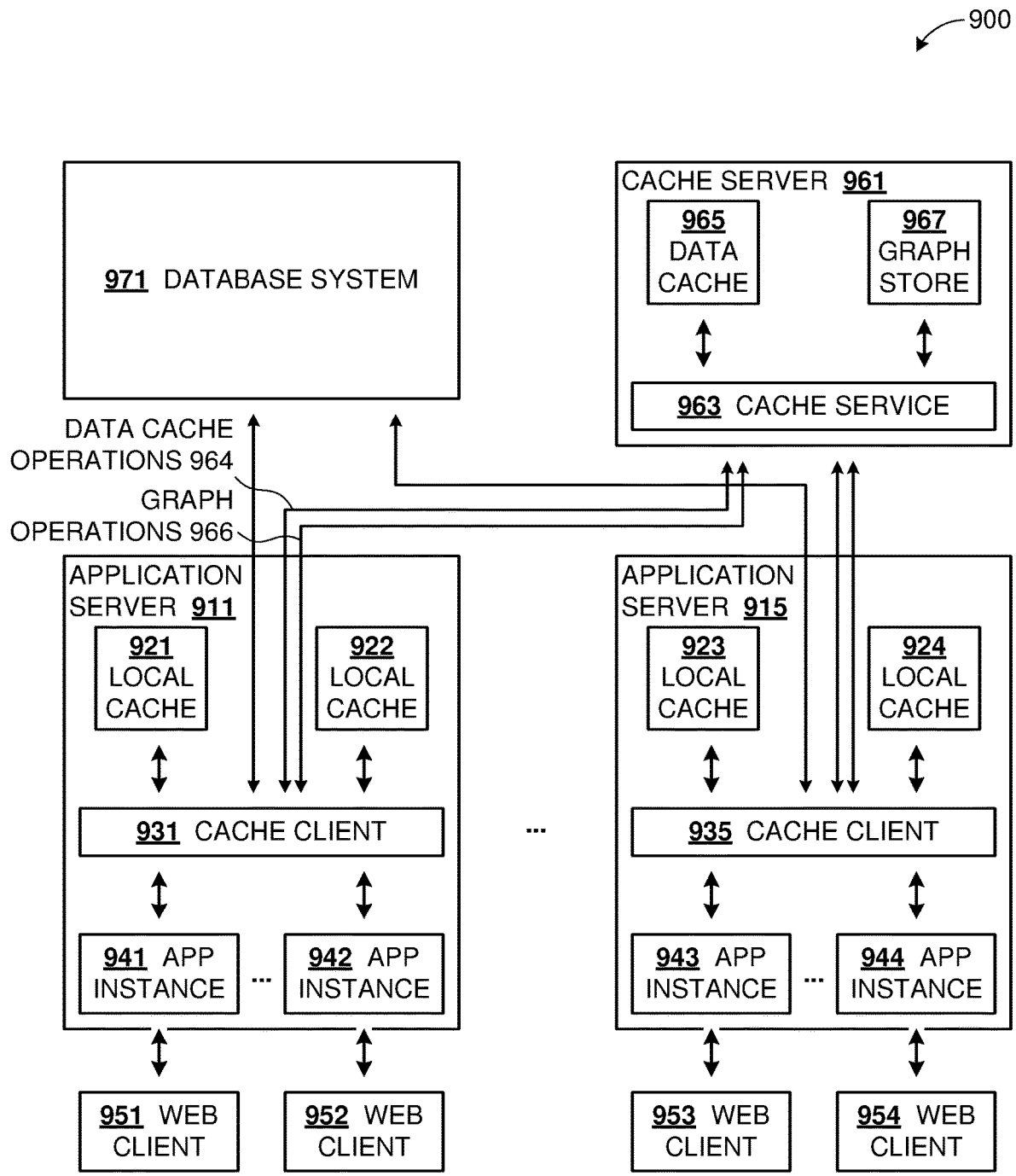
FIG. 9 is an architecture diagram of a first example implementation of the disclosed technologies.

FIG. 9 is an architecture diagram 900 of a first example implementation of the disclosed technologies. In this architecture, cache clients 931, 935 can be co-resident with various application instances 941-944 and can coordinate data requests and cache management with cache service 963 and a database system 971.

Application servers 911, 915 can host application instances 941-944 as shown. Each application server 911, 915 can have a resident cache client 931, 935. Local caches 921-924 can be managed by the cache clients 931, 935 and can be hosted within or coupled to the application servers 911, 915. As illustrated, cache clients 931, 935 can maintain separate local caches 921-924 for each application instance 941-944. However, in other examples, a single local cache 921, 923 can be deployed within each application server 911, 915. In further examples, a plurality of cache clients 931, 935 can be deployed on each application server 911, 915, up to a respective cache client for each application instance 941-944.

Cache clients 931, 935 can fulfill some data requests directly from local caches 921-924. For data items not in local caches 921-924, the cache clients 931, 935 can access original or master copies of such data items from database system 971, or can access cache server 961 for data cache operations as indicated by arrow 964. The cache server 961 can host a client-facing cache service 963, together with a data cache 965 and a graph store 967. Cache service 963 can provide an interface to receive, process, and respond to data cache requests 964 from cache clients 931, 935 and can maintain or access the data cache 965 accordingly. Cache service 963 can also support graph operations 966 on or using graph store 967. For example, cache clients 931, 935 can request a graph to be stored or updated in the graph store 967. Cache service 963 can also use the graph store 967 to process data item requests as described herein: mapping a request context to a corresponding graph in the graph store 967, and collecting the linked items, as specified by the corresponding graph, from the data cache 965.

Application instances 941-944 can provide application services to respective web clients 951-954 as shown. Particularly, application instances 941-944 can support web transactions over respective network interfaces of the application servers 911, 915. However, the architecture 900 is not limited to web services. In other examples, clients can be local to the application servers 911, 915. In further examples, application instances 941-944 can be standalone task processors, running database queries, executing campaign programs, acquiring data for the database system 971, or performing other tasks.

Numerous variations are possible. Separate services can be deployed on cache server 961 to support data cache operations 964 and graph operations 966 respectively. Graph store 967 can be integrated into the data cache 965.

Second Example Architecture

Figure 10:
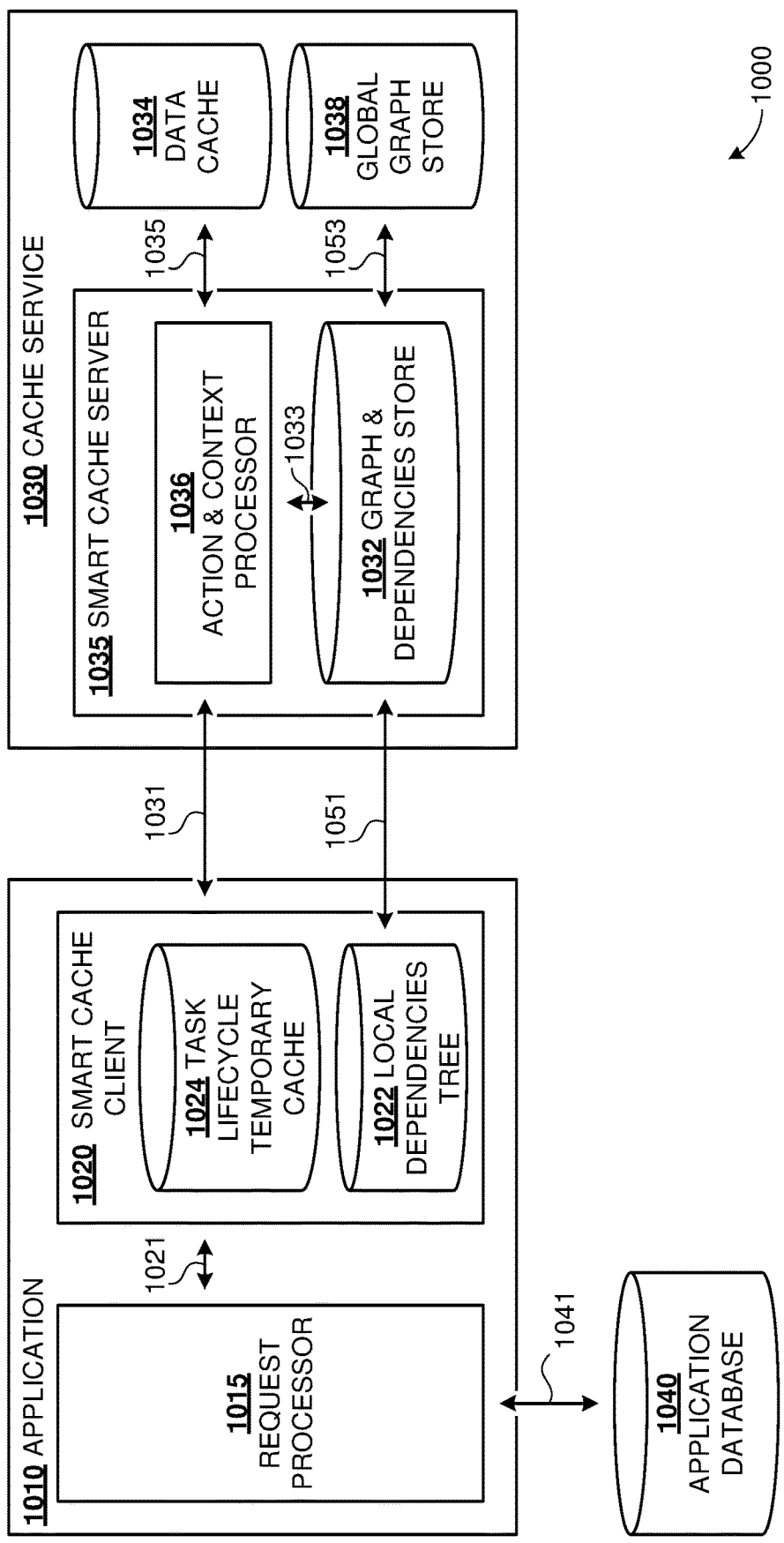
FIG. 10 is an architecture diagram of a second example implementation of the disclosed technologies.

FIG. 10 is an architecture diagram 1000 of a second example implementation of the disclosed technologies. An application 1010 can be coupled to an application database 1040, and can employ multi-level caching, with cache service 1030 and cache client 1020, to improve efficiency.

Components of application 1010 can issue requests to read or write data items, which can be maintained in the application database 1040. Application 1010 can include a request processor 1015 to handle all such requests. When a read request is received, request processor 1015 can first check to see if a cached copy of the requested data item is available, failing which the request processor 1015 can retrieve the requested data item from the database 1040 (via arrow 1041).

A primary data cache 1034 can be maintained by a cache service 1030. The data cache 1034 can be implemented as a storage system coupled to a smart cache server 1035 which hosts other components of the cache service 1030 such as action and context processor 1036 and a graph and dependencies store 1032.

The cache 1034 can be presented to the request processor 1015 as a smart cache client 1020 which can be integrated with or within application 1010. Cache client 1020 can include a local dependencies tree 1022 and a temporary cache 1024 configured to store requested data items for the duration (lifecycle) of a task being performed by application 1010.

Operationally, the smart cache client 1020 can learn patterns of data access requests from request processor 1015 to build the local dependencies tree 1022. Requests for data from request processor 1015 can be served locally from the task lifecycle temporary cache 1024 if possible, otherwise retrieved from the cache service 1030.

At the cache service 1030, the action & context processor 1036 can process requests from cache client 1020 (arrow 1031). For a request associated with an action or context of application 1010, the processor 1036 can identify a corresponding graph, retrieve the identified graph from the graph and dependencies store 1032 (arrow 1033), collect some or all the data items linked by the graph from data cache 1034 (arrow 1035), and return the collected items to the cache client 1020 (arrow 1031).

In some situations, only a portion of the data items linked by a graph may be present and valid in the data cache 1034. In some examples, the available data items can be returned to the cache client 1020 along with entries for the additional data items indicating that such data items could be linked by graph but could be unavailable within the cache 1034. The unavailable items can be reported to request processor 1015, and can be prefetched from database 1040 so as to be available in local cache 1024 when needed. In other examples, the entries for missing data items can be omitted, and subsequent requests for any such missing data items can be handled as a cache miss from cache client 1020 and cache service 1034, followed by retrieval of the missing data item by the request processor 1015 from database 1040.

Diagram 1000 also provides pathways to support graph operations. New or updated local dependency trees (e.g. graphs) can be transmitted to the cache service 1030 to be stored in the graph/dependencies store 1032 (arrow 1051). The cache client 1020 can also retrieve a graph, if one already exists, from the graph/dependencies store 1032. That is, dependencies or graphs can be synchronized in either direction via arrow 1051. In some examples, multiple instances of cache service 1030 can utilize a common data cache 1034. In such cases, a global graph store 1038 can be used to enable global synchronization of graphs (arrow 1053) among the multiple instances of cache server 1030, and graph store 1032 can be a cache of the global graph store 1038.

The disclosed technology also supports requests to write data items. A data item to be written can be forwarded from request processor 1015 to the cache client 1020 (arrow 1021) for storage in local cache 1024, and forwarded further to the cache service 1030 (arrow 1031) for storage in main cache 1034 (arrow 1035). The data item to be written can also be transmitted (arrow 1041) to be updated or stored in the main database 1040.

Third Example Architecture

Figure 11:
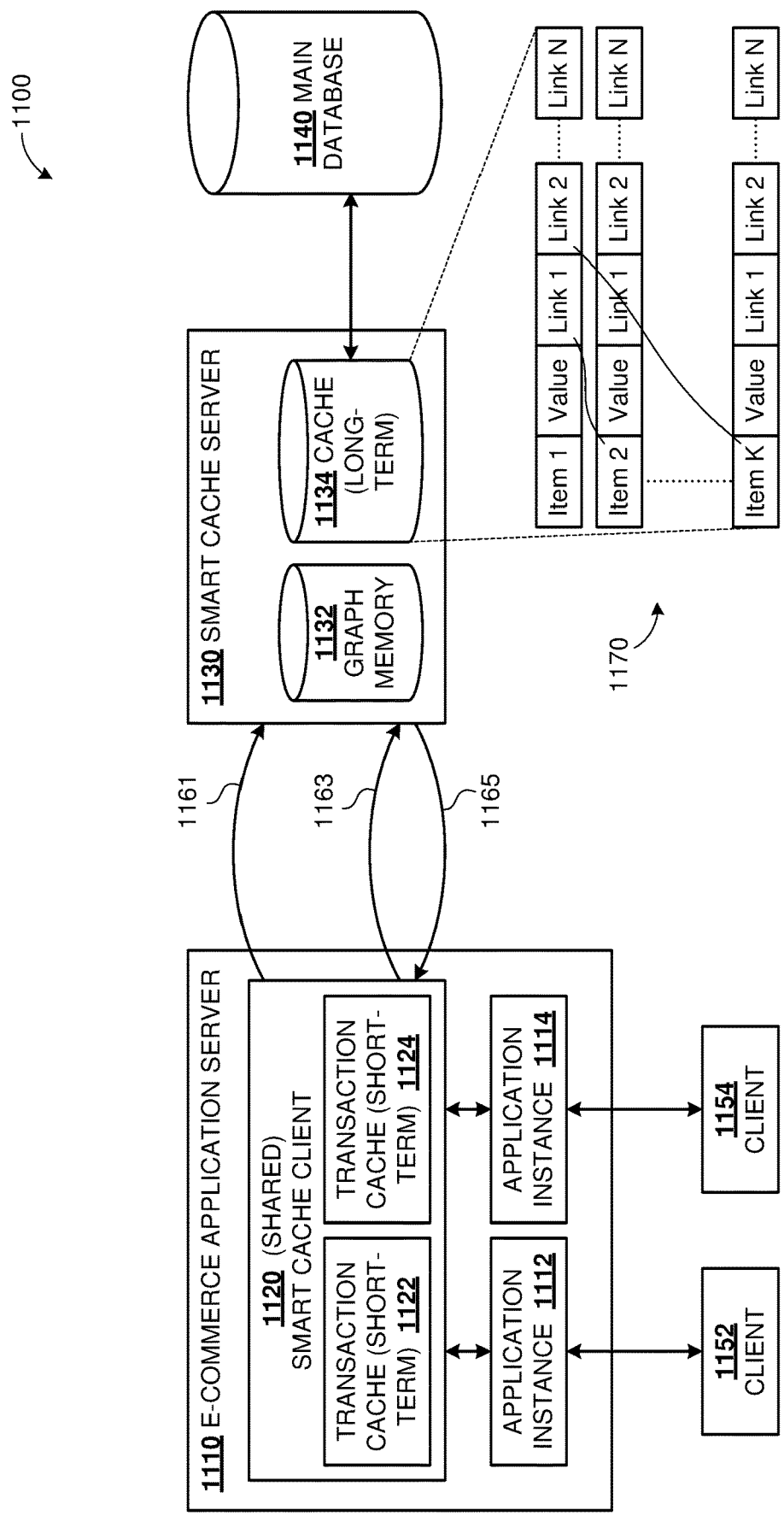
FIG. 11 is an architecture diagram of a third example implementation of the disclosed technologies.

FIG. 11 is an architecture diagram 1100 of a third example implementation of the disclosed technologies. Caching for an e-commerce application server 1110 can be provided by a smart cache server 1130 and a smart cache client 1120 resident on the application server 1110 and acting as a proxy for the cache server 1130. In diagram 1100, the cache server 1130 is coupled to main database 1140, and can fetch any requested data items that are not already in cache 1134, or for which cached copies are stale.

On application server 1110, application instances 1112, 1114 can perform respective tasks for clients 1152, 1154. Data requests from the application instances can be directed to a shared smart cache client 1120. The shared cache client 1120 can maintain one or more short-term transaction caches 1122, 1124 with which to serve data requests from the coupled application instances 1112, 1114. When a data item that is not in short-term transaction cache 1122 is requested by application instance 1112, the smart cache client 1120 can forward the request to smart cache server 1130 as indicated at arrow 1163. If the data item can be served from cache 1134, the data item can be returned at arrow 1165, which can then be stored in the short-term cache 1122 and also served to the requesting application instance 1112. If the long-term cache 1134 is unable to serve the requested data item, the smart cache server 1130 can retrieve the data item from database 1140 which can serve as origin for smart cache content. Data retrieved from main database 1140 can be stored in cache 1134 and then used to respond to cache client 1120 and, in turn, application instance 1112.

Data requests 1163 from cache client 1120 to cache server 1130 can be of different forms. In one form, a request 1163 can specify a requested data item, together with a context for the request as described herein. The corresponding response 1165 can include some or all linked data items specified in a graph associated with the requesting context. In another form, the request 1163 can omit the requested data item, because specification of the context can be sufficient to assure that relevant related data items linked by a corresponding graph can be returned at 1165, including the requested data item. In a third form, the request 1163 can specify the requested data item without any context. This form can be used in cases where the cache client 1120 can determine that the requested data item is not part of the graph associated with a current context. In this case, the smart cache server can act without recourse to any graph, retrieving the requested data item either from cache 1134 or, if needed, from the database 1140. That is, the requested data item can be retrieved before it has been added to the graph for the current context. In further cases, the requested data item may only be required once, or infrequently, and may never be added to the graph for the current context.

Responses 1165 can also take various forms. In one form, the collected data items can be returned as an unstructured collection of e.g. key-value pairs. In another form, the collected data items can be returned along with the associated graph. Such a form can be helpful where multiple application instances can share a single context, either concurrently or separated in time. The graph can be embedded as links among records for the various data items, or can be provided as a distinct data structure.

Also shown in diagram 1100 is an arrow 1161 for graph operations. A graph for a given context can be built at the smart cache client 1120 and can be uploaded to cache server 1130 to be stored in graph memory 1132. Similarly, when a graph is updated by the smart cache client 1120, a corresponding update request 1161 can be transmitted to the smart cache server 1130. These requests can be of a format ⟨ Add|Context|Graph ⟩ or ⟨ Update|Context|Graph ⟩; change notation can be used in an update request to avoid having to transmit an entire graph when only one or a few updates are to be made.

The cache 1134 can be organized as a collection of records 1170 for respective data items, each record including an identifier (e.g. "Item 1") of the data item, a value for the data item, and associated links (e.g. "Link 1") pointing to dependent data items.

Example Methods—Graph Construction

A graph of linked entities, as used with the disclosed technologies, can be generated in various ways. The graph can be built at the cache client, and then transmitted to the cache server for storage in a graph repository. The graph repository can store respective graphs for each of multiple contexts.

Figure 12:
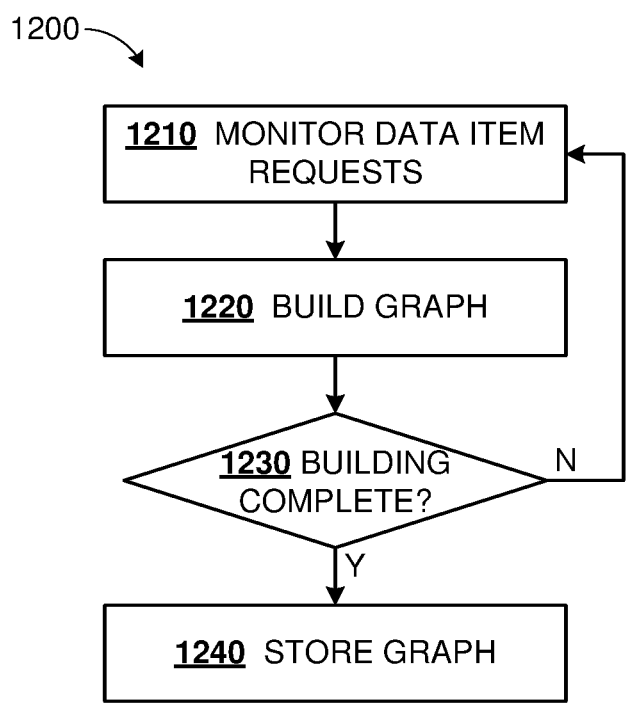
FIG. 12 is a flowchart of an example method for building a graph according to the disclosed technologies.

FIG. 12 is a flowchart 1200 of an example method for building a graph. At process block 1210, data item requests can be monitored. For example, data requests can be fielded from an application instance working in a particular context, and data items observed to have associated requests can be identified. Within the particular context, an association can be determined if a request for data item I1 is followed by a request for data item I2, or vice versa, at least a threshold number of times. At process block 1220, the graph can be built. To illustrate, if data items I1, I2 are determined to be associated, graph vertices can be added for data items I1, I2 (if not already present), and an edge joining these vertices can be added to the graph. At decision block 1230, a check can be made whether the graph building is complete. This determination can be based on reaching or meeting any of various criteria, singly or in combination. Such criteria can include a threshold elapsed time since the context was first used, a threshold number of transactions completed with the same context, a threshold number of data requests for the context, or a stability criterion such as less than a threshold number of graph changes over a predetermined number of sessions using the context. If the graph building is not complete, then the method follows the N branch from decision block 1230 back to process block 1210, and monitoring of data item requests can continue. If the graph building has completed, then the Y branch is followed to process block 1240, and the graph can be stored in a repository. The stored graph can be linked to the current context, either within the repository or in a separate data structure, so that when the same context is used subsequently, the context can be mapped to the graph and the graph can be retrieved from the repository.

Numerous variations are possible. In some examples, the method of flowchart 1200 can be performed by a cache client of a cache server, while in other examples the method can be performed at the cache server. In further examples, the method can be performed by a service that is distinct from both the cache client and the cache server.

Learning Dependencies and Patterns

Dependencies can be learned over one or more transactions or sessions having a given context. As data requests are monitored, tentative dependencies can be established, reflecting e.g. "data item I2 was observed to follow data item I1". In some examples, a single observation can be sufficient to establish a dependency, while in other examples, a threshold number of observations can be required to establish a dependency. A counter can be maintained for each candidate dependency, and can be incremented each time the dependency is observed. In further examples, the counter can be decremented each time the dependency is absent, e.g. data item was requested but data item I2 was not. Over time, some candidate dependencies can reach the threshold count. When a capture criterion has been met, a dependency tree or other graph can be captured, comprising those candidate dependencies that have reached threshold. The capture criterion can be completion of a transaction, termination of a session, reaching a threshold number of confirmed dependencies, reaching a threshold number of data requests for the given context, or other such criterion. The captured graph can be stored in a graph repository. During subsequent activities with the same context, monitoring can be continued to detect changes in the graph, and the graph can be updated, adding or deleting vertices (data items) or edges (dependencies) as appropriate.

In some examples, dependencies can be built according to a call stack from which data requests are issued. So, if data requests for items I1, I2, I3 originate from functions F1, F2, F3 respectively, the relationship between F1, F2, F3 in a call stack can be used to construct edges between items I1, I2, I3 in a dependency graph. If F2 is called from F1, then I2 can be linked as dependent on I1. If F3 is called from F2, then I3 can be linked as dependent on I2. However if F3 is called directly from F1, even if it is called after F2, I3 can be linked as dependent on I1. If F1, F2, F3 are called at the same or independent positions in the call stack, then each of I1, I2, I3 can be dependent on some higher level data item or on a root node of the dependency graph, with no edges directly joining any pair of I1, I2, I3.

Example Methods—Graph Maintenance

As contexts evolve, a graph can change over its lifetime. FIGS. 13-16 relate to various methods that can be employed to maintain a graph. FIG. 13 relates to removal of a data item from a graph, while FIGS. 14-16 pertain to situations where a request is made for a data item not included in a graph for an instant context.

FIG. 13 is a flowchart 1300 of an example method for updating a graph. At process block 1310, a determination can be made that a data item I1 linked in a graph is no longer associated with the associated context. To illustrate, in an e-commerce transaction, an item might be removed from a shopping cart, or the item could be deleted from inventory before the transaction is completed. As the data item I1 is no longer needed in the instant context, the graph can be updated at process block 1320 by deleting the data item I1 can be deleted from the graph. Deletion can be variously implemented by removing graph edges linking to the graph vertex for data item I1, by removing the graph vertex, or by marking edges or the graph vertex invalid. Then, at process block 1330, the updated graph can be stored in a graph repository. A previous graph for the same context can be overwritten, erased, or marked invalid.

FIG. 14 is a flowchart 1400 of a first example method for handling a request for a new data item. As used herein, a "new" data item is one that is not presently linked in a graph of a current context. A new data item may have been in existence for a long time, may be linked in other graphs, or may have been previously linked in the graph of the current context.

At process block 1410, a request can be received for a new data item I3 not presently linked in the graph of a present context. At process block 1420, the graph can be updated, by adding a vertex or linking edge for the new data item I3. Then at process block 1430, the updated graph can be stored in a graph repository. This method can be performed after the graph has already been put in service, or can be performed initially, prior to putting the graph in service. That is, as data items are requested by one or more application instances having a given context, the items can be added to the graph for the given context, which is to say a vertex representing each data item can be added to the graph or linked to previously existing data items (vertices) in the graph.

FIG. 15 is a flowchart 1500 of a second example method for handling a request for a new data item. In this example, a context can be associated with more than one graph. At process block 1510, a request can be received for a new data item I3, that is, for an item not linked in a first graph associated with the context of the request. However, a second graph (not identical to the first graph) can also be associated with the present context, and can include the new data item I3. Then, at process block 1520, a second group of data items, linked by the second graph, can be retrieved from the first cache and stored in the second cache. In some examples, the second graph and the first graph can share one or more vertices or edges, while in other examples the first and second graphs can be disjoint, meaning that they have no common data items (vertices).

FIG. 16 is a flowchart 1600 of a third example method for handling a request for a new data item. In this example, recourse is made to a database system on which original or master copies of one or more data items are stored. At process block 1610, a request can be received for a new data item I3, that is, for an item not linked in a graph associated with the context of the request. Accordingly, at process block 1620, the new data item I3 can be retrieved from a database system associated with a requesting application instance. At process block 1630, the retrieved data item I3 can be stored in a data cache. In some examples, the data item I3 can be stored locally or for a transient duration in the second cache, i.e. at a cache client. In other examples, the data item I3 can be stored remotely or for a persistent duration in the first cache, i.e. at a cache server. The data item I3 can also be added to the graph as described herein.

A Generalized Computer Environment

Figure 17:
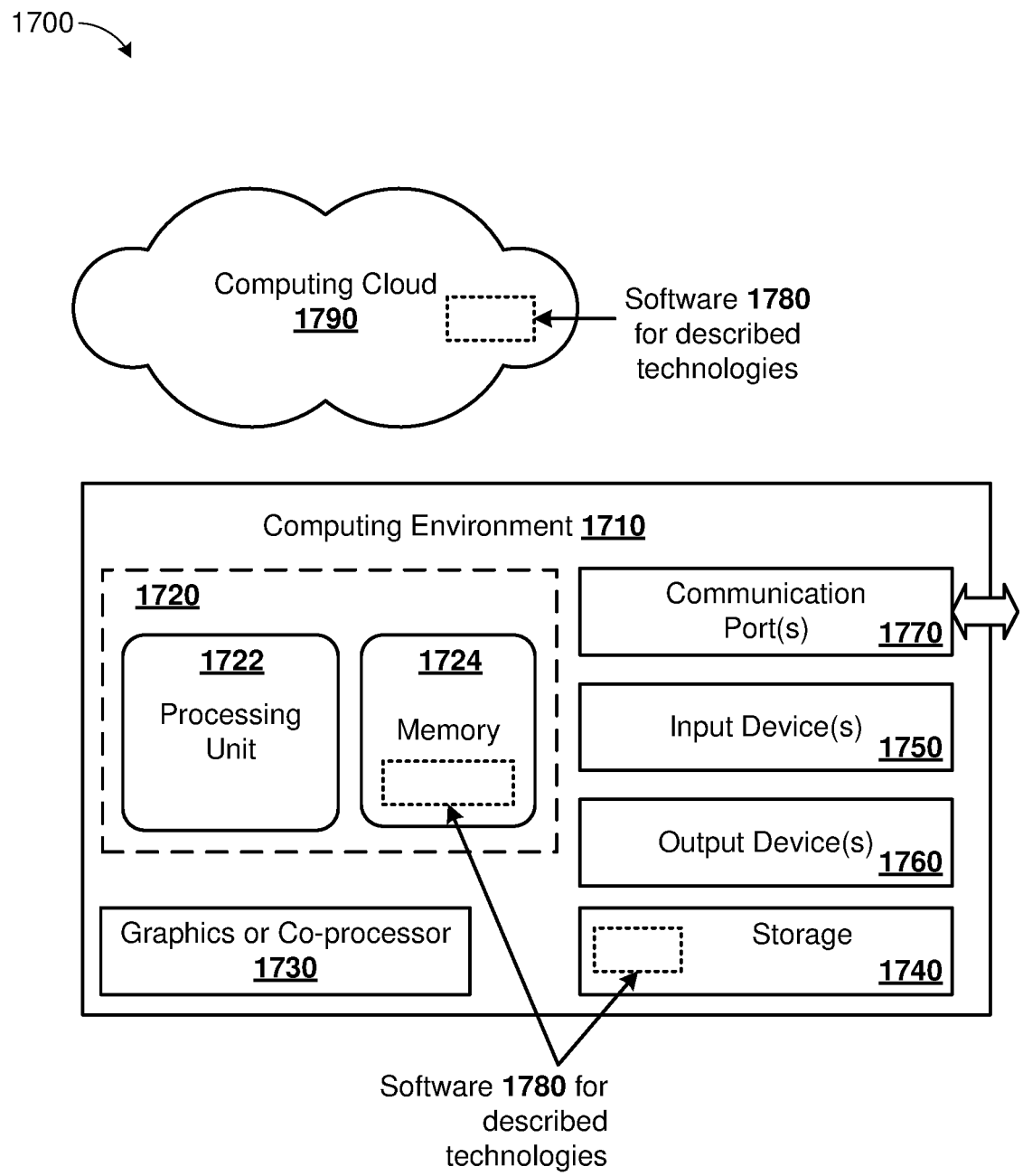
FIG. 17 is a diagram schematically depicting a computing environment suitable for implementation of disclosed technologies.

FIG. 17 illustrates a generalized example of a suitable computing system 1700 in which described examples, techniques, and technologies, including construction, deployment, operation, and maintenance of a predictive caching system according to disclosed technologies can be implemented. The computing system 1700 is not intended to suggest any limitation as to scope of use or functionality of the present disclosure, as the innovations can be implemented in diverse general-purpose or special-purpose computing systems.

With reference to FIG. 17, computing environment 1710 includes one or more processing units 1722 and memory 1724. In FIG. 17, this basic configuration 1720 is included within a dashed line. Processing unit 1722 executes computer-executable instructions, such as for implementing any of the methods or objects described herein for a smart cache client, a smart cache server, a predictive caching system, or various other architectures, caches, components, handlers, managers, modules, repositories, or services described herein. Processing unit 1722 can be a general-purpose central processing unit (CPU), a processor in an application-specific integrated circuit (ASIC), or any other type of processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), nonvolatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730. The memory 1724 can also store configuration data, UI displays, browser code, data structures including data tables, working tables, change logs, output structures, input fields, output fields, data values, indices, or flags, as well as other configuration and operational data.

A computing system 1710 can have additional features, such as one or more of storage 1740, input devices 1750, output devices 1760, or communication ports 1770. An interconnection mechanism (not shown) such as a bus, controller, or network interconnects the components of the computing environment 1710. Typically, operating system software (not shown) provides an operating environment for other software executing in the computing environment 1710, and coordinates activities of the components of the computing environment 1710.

The tangible storage 1740 can be removable or non-removable, and includes magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein.

The input device(s) 1750 can be a mechanical, touch-sensing, or proximity-sensing input device such as a keyboard, mouse, pen, touchscreen, trackball, a voice input device, a scanning device, or another device that provides input to the computing environment 1710. The output device(s) 1760 can be a display, printer, speaker, optical disk writer, or another device that provides output from the computing environment 1710.

The communication port(s) 1770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1700 can also include a computing cloud 1790 in which instructions implementing all or a portion of the disclosed technology are executed. Any combination of memory 1724, storage 1740, and computing cloud 1790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 18:
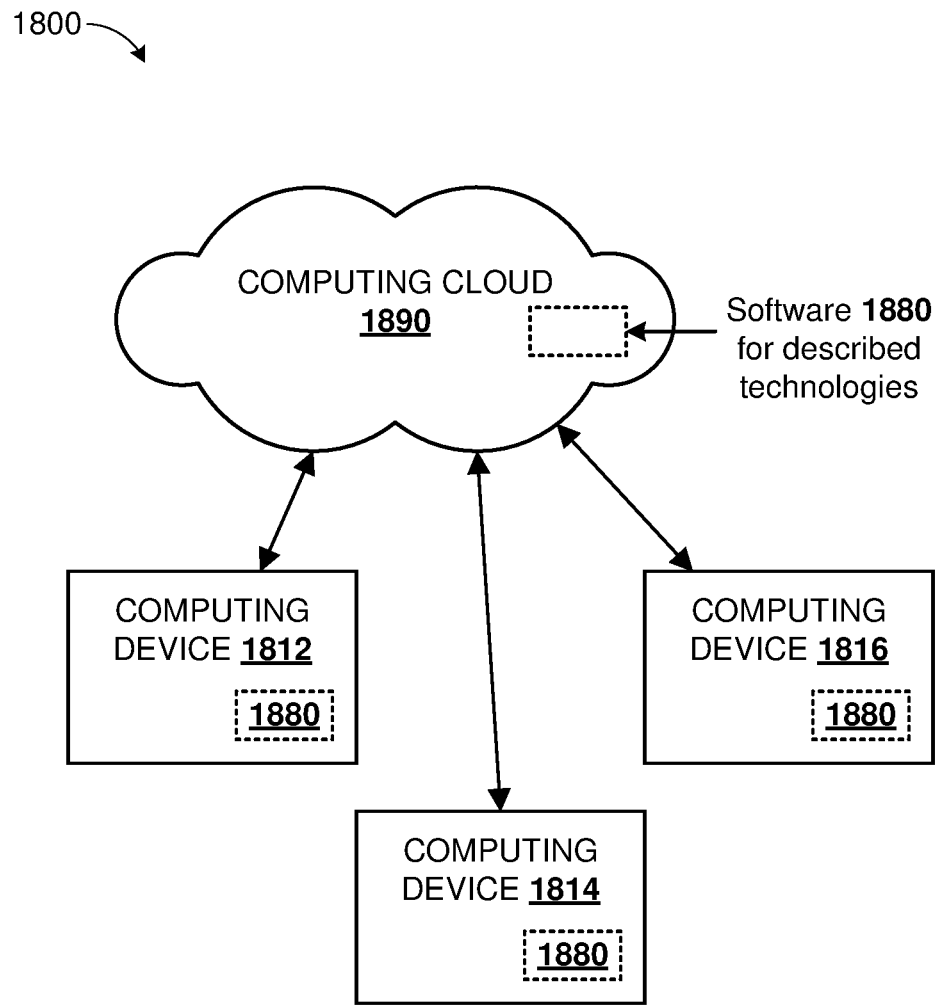
FIG. 18 is a diagram schematically depicting computing devices operating in conjunction with a computing cloud for implementation of disclosed technologies.

FIG. 18 depicts an example cloud computing environment 1800 in which the described technologies can be implemented. The cloud computing environment 1800 comprises a computing cloud 1890 containing resources and providing services. The computing cloud 1890 can comprise various types of cloud computing resources, such as computer servers, data storage repositories, networking resources, and so forth. The computing cloud 1890 can be centrally located (e.g., provided by a data center of a business or organization) or distributed (e.g., provided by various computing resources located at different locations, such as different data centers and/or located in different cities or countries).

The computing cloud 1890 can be operatively connected to various types of computing devices (e.g., client computing devices), such as computing devices 1812, 1814, and 1816, and can provide a range of computing services thereto. One or more of computing devices 1812, 1814, and 1816 can be computers (e.g., servers, virtual machines, embedded systems, desktop, or laptop computers), mobile devices (e.g., tablet computers, smartphones, or wearable appliances), or other types of computing devices. Communication links between computing cloud 1890 and computing devices 1812, 1814, and 1816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1812, 1814, and 1816 can also be connected to each other.

Computing devices 1812, 1814, and 1816 can utilize the computing cloud 1890 to obtain computing services and perform computing operations (e.g., data processing, data storage, and the like). Particularly, software 1880 for performing the described innovative technologies can be resident or executed in the computing cloud 1890, in computing devices 1812, 1814, and 1816, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "add," "apply," "build," "bundle," "calculate," "call," "check," "collect," "compress," "configure," "couple," "define," "delete," "determine," "download," "encrypt," "establish," "execute," "find," "flush," "form," "forward," "generate," "host," "identify," "invoke," "issue," "learn," "link," "maintain," "map," "message," "monitor," "obtain," "package," "perform," "process," "provide," "receive," "remove," "request," "respond," "retrieve," "send," "serve," "set," "share," "store," "transmit," "travel," "traverse," "update," "upload," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The term computer-readable storage media does not include signals and carrier waves. In addition, the term computer-readable storage media does not include communication ports (e.g., 1770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method comprising:
   maintaining a graph specific to a first context, wherein the graph comprises a plurality of vertices, corresponding to respective data items including a first data item, and a plurality of edges;
   constructing an edge of the plurality of edges between a first vertex and a second vertex of the plurality of vertices, based on an observed first association between first past requests for the respective data items of the first and second vertices in the first context;
   subsequent to the constructing, receiving, from an application instance, a first request having the first context and identifying the first data item to be returned in response to the first request;
   responsive to the first request:
      based on the first context, identifying the graph specific to the first context;
      traversing the plurality of vertices to identify one or more additional data items beyond the first request, that are linked, in the graph, to the first data item, wherein the one or more additional data items are linked based on associations observed between respective past requests, the associations including the first association between the first past requests;
      retrieving a plurality of data items, comprising the first data item and the one or more additional data items, from a first cache; and
      storing the retrieved plurality of data items in a second cache distinct from the first cache;
   subsequently receiving a second request from the application instance for a second data item distinct from the first data item, the second data item being one of the one or more additional data items linked in the graph specific to the first context; and
   responsive to the second request:
      retrieving the second data item from the second cache; and
      fulfilling the second request with the retrieved second data item.

2. The method of claim 1, wherein the maintaining the graph further comprises:
   adding further data items of the plurality of data items to the graph as the respective further data items are requested, prior to the first request, by one or more application instances having the first context.

3. The method of claim 1, wherein the maintaining the graph further comprises:
   deleting particular data items from the graph as the particular data items are determined to be no longer associated with the first context.

4. The method of claim 1, wherein the first context characterizes a transaction, and further comprising:
   flushing the plurality of data items from the second cache responsive to completion of the transaction.

5. The method of claim 1, wherein the first cache is managed by a cache server and the receiving the first request, the retrieving the plurality of data items, the storing, the receiving the second request, and the fulfilling actions are performed by a client of the cache server.

6. The method of claim 5, wherein the client and the application instance are co-located on an application server distinct from the cache server.

7. The method of claim 5, further comprising:
   building the graph at the client of the cache server and transmitting the graph to the cache server for storage in a graph repository at the cache server.

8. The method of claim 5, wherein the client is a first client, and the method further comprises:
   forwarding the plurality of data items from the first client to a second client of the cache server prior to the second client receiving any request for one or more of the plurality of data items in the first context.

9. The method of claim 1, wherein the graph is a first graph, and further comprising:
   receiving a third request from the application instance for a new data item not linked in the first graph; and
   responsive to the third request, retrieving further data items, linked in a second graph associated with the first context and including the new data item, from the first cache and storing the further data items in the second cache.

10. The method of claim 1, further comprising:
    receiving a third request from the application instance for a new data item not included in the plurality of data items;
    retrieving the new data item from a database system; and
    storing the new data item in the first cache.

11. The method of claim 1, wherein the retrieving the plurality of data items further comprises:
    issuing a third request for the first data item to a cache server hosting the first cache, the third request specifying the first context;
    receiving an encrypted payload from the cache server; and
    decrypting the encrypted payload to extract the plurality of data items.

12. Computer-readable storage media storing instructions which, when executed by one or more hardware processors, cause the one or more hardware processors to perform operations comprising:
    maintaining a graph stored in a graph repository, wherein the graph comprises a plurality of vertices, corresponding to respective data items including a given data item, and a plurality of edges;

constructing an edge of the plurality of edges between a first vertex and a second vertex of the plurality of vertices, based on an observed first association between first past requests for the respective data items of the first and second vertices;

subsequent to the constructing, receiving, from a client, a request comprising information describing a context of a requesting application instance and further information describing the given data item to be returned in response to the request;

mapping the context to the graph;

traversing the plurality of vertices to identify one or more additional data items that are linked to the given data item in the graph, wherein the one or more additional data items are linked based on associations observed between respective past requests, the associations including the first association between the first past requests;

collecting a plurality of data items, including the given data item and the one or more additional data items, from a data cache; and returning the collected plurality of data items to the client in response to the request.

13. The computer-readable storage media of claim 12, wherein the information describing the context comprises a client identifier, a session identifier, and an operation identifier.

14. The computer-readable storage media of claim 12, wherein the traversing comprises following links indicating dependencies between pairs of data items, among the plurality of data items, until traversal of the graph is complete.

15. The computer-readable storage media of claim 14, wherein the links are stored with respective ones of the plurality of data items in the data cache.

16. The computer-readable storage media of claim 12, wherein the operations further comprise:
receiving a second request for a second data item, the second request comprising information describing the context;
determining that the second data item is not among the plurality of data items;
determining that the second data item is present in the data cache; and
adding the second data item to the graph.

17. The computer-readable storage media of claim 12, wherein the operations further comprise:
receiving a second request to store the graph in the graph repository.

18. A system comprising:
a plurality of servers including a cache server and one or more application servers, each server of the plurality of servers comprising one or more processors with memory coupled thereto and a network connection, wherein the cache server is coupled to the one or more application servers via the respective network connections of the one or more application servers;
wherein each of the one or more application servers is configured to execute instructions of:
an application cache client hosting a local cache; and
one or more instances of an application;
wherein the cache server is configured to execute instructions of an application cache service hosting a shared application data cache and a graph store;
wherein the application cache client is configured to forward a first request for a first data item, received from a first instance of the one or more instances of the application, to the application cache service together with an application context of the first instance of the application; and
wherein the application cache service is configured to:
map the application context of the first instance of the application to a corresponding graph in the graph store;
collect a plurality of data items, specified by the corresponding graph and including the first data item, from the shared application data cache, wherein the plurality of data items are linked in the corresponding graph based on associations observed between past requests for the plurality of data items; and
return the collected data items to the forwarding application cache client to be stored in the local cache.

19. The system of claim 18, wherein the one or more application servers support web transactions over the respective network connections of the one or more application servers.

20. The system of claim 18, wherein the forwarding application cache client is configured to:
responsive to the first request, forward only the first data item, among the collected data items, to the first instance of the application.

* * * * *